United States Patent
Yang et al.

(10) Patent No.: US 10,613,882 B2
(45) Date of Patent: Apr. 7, 2020

(54) ACTIVE DRIVE API

(71) Applicant: SEAGATE TECHNOLOGY LLC, Cupertino, CA (US)

(72) Inventors: Chiaming Yang, Fremont, CA (US); Jon D. Trantham, Shakopee, MN (US); Timothy Richard Feldman, Longmont, CO (US); Bryan David Wyatt, Shakopee, MN (US); David B. Anderson, Shakopee, MN (US); Robert John Warmka, Shakopee, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/378,995

(22) Filed: Dec. 14, 2016

(65) Prior Publication Data
US 2018/0107467 A1    Apr. 19, 2018

Related U.S. Application Data

(60) Provisional application No. 62/408,446, filed on Oct. 14, 2016.

(51) Int. Cl.
| | | |
|---|---|---|
| *G06F 9/455* | (2018.01) | |
| *G06F 8/40* | (2018.01) | |
| *G06F 8/61* | (2018.01) | |
| *G06F 9/445* | (2018.01) | |

(52) U.S. Cl.
CPC ............ *G06F 9/45508* (2013.01); *G06F 8/40* (2013.01); *G06F 8/61* (2013.01); *G06F 9/445* (2013.01)

(58) Field of Classification Search
CPC ................. G06F 8/61; G06F 8/60–656; G06F 9/445–45512
See application file for complete search history.

(56) References Cited

U.S. PATENT DOCUMENTS

| | | | |
|---|---|---|---|
| 5,548,751 A * | 8/1996 | Ryu | ...................... G06F 3/0601 |
| 5,771,379 A | 6/1998 | Gore, Jr. et al. | |
| 6,128,012 A | 10/2000 | Seidensticker, Jr. | |
| 6,226,665 B1 | 5/2001 | Deo | |
| 6,282,697 B1 * | 8/2001 | Fables | ...................... G06F 8/20 |
| | | | 709/201 |
| 6,298,401 B1 | 10/2001 | Anderson | |
| 6,321,358 B1 | 11/2001 | Anderson | |
| 6,466,978 B1 * | 10/2002 | Mukherjee | .............. G06F 3/061 |
| | | | 348/E5.008 |

(Continued)

OTHER PUBLICATIONS

Runde et al., An Active Storage Framework for Object Storage Devices, published by IEEE, 2012, pp. 1-12 (Year: 2012).*

(Continued)

*Primary Examiner* — S. Sough
*Assistant Examiner* — Zheng Wei
(74) *Attorney, Agent, or Firm* — Westman, Champlin & Koehler, P.A.

(57) ABSTRACT

An application programming interface (API) that enables installation of an application as one or more key-value objects on a data storage drive such as a hard disk drive, a solid state drive or a hybrid drive. The API also enables execution of the application within a controlled environment of the data storage drive.

20 Claims, 15 Drawing Sheets

(56) References Cited

U.S. PATENT DOCUMENTS

| | | | | |
|---|---|---|---|---|
| 6,601,101 | B1* | 7/2003 | Lee | H04L 67/1008 709/202 |
| 6,718,540 | B1* | 4/2004 | Azua | G06F 9/45508 717/147 |
| 6,826,613 | B1* | 11/2004 | Wang | G06F 3/0607 709/202 |
| 6,993,524 | B1* | 1/2006 | Watanabe | G06F 21/6218 |
| 7,231,401 | B1* | 6/2007 | Inohara | G06F 3/0607 |
| 7,328,303 | B1 | 2/2008 | Waterhouse | |
| 7,634,477 | B2* | 12/2009 | Hinshaw | G06F 16/273 |
| 7,725,614 | B2 | 5/2010 | Jogand-Coulomb | |
| 7,826,161 | B2 | 11/2010 | Riedel | |
| 7,840,937 | B1* | 11/2010 | Chiluvuri | G06F 8/36 717/106 |
| 8,078,448 | B1* | 12/2011 | Wohlberg | G06F 11/3684 703/23 |
| 8,661,425 | B1* | 2/2014 | Polyudov | G06F 8/4436 717/162 |
| 8,793,531 | B2* | 7/2014 | George | G06F 17/30519 714/11 |
| 8,880,551 | B2* | 11/2014 | Hinshaw | G06F 17/30477 707/770 |
| 8,949,817 | B1* | 2/2015 | Le | G06F 8/61 717/168 |
| 9,015,333 | B2* | 4/2015 | Rao | H04L 67/1097 709/219 |
| 9,172,698 | B1* | 10/2015 | Evans | H04L 63/0853 |
| 9,298,521 | B1 | 3/2016 | Feldman | |
| 9,641,385 | B1 | 5/2017 | Daniel et al. | |
| 9,798,673 | B2 | 10/2017 | Peterson et al. | |
| 9,830,203 | B2 | 11/2017 | Schnellinger et al. | |
| 9,874,915 | B2* | 1/2018 | Frick | G06F 1/3203 |
| 2002/0095525 | A1* | 7/2002 | Fables | G06F 9/485 719/318 |
| 2004/0003043 | A1 | 1/2004 | Rajamony et al. | |
| 2005/0081187 | A1 | 4/2005 | Odinak | |
| 2006/0070043 | A1 | 3/2006 | Viega et al. | |
| 2006/0129982 | A1* | 6/2006 | Doyle | G06F 9/45508 717/115 |
| 2006/0288156 | A1 | 12/2006 | Fish et al. | |
| 2006/0289659 | A1 | 12/2006 | Mizushima | |
| 2007/0067325 | A1* | 3/2007 | Weitzner | G06F 9/445 |
| 2007/0203950 | A1* | 8/2007 | Inohara | G06F 3/0607 |
| 2008/0229401 | A1 | 9/2008 | Magne | |
| 2008/0307201 | A1 | 12/2008 | Flachs | |
| 2010/0082929 | A1 | 4/2010 | Kobayashi | |
| 2011/0019007 | A1* | 1/2011 | Elazar | H04N 1/00244 348/207.1 |
| 2011/0025858 | A1* | 2/2011 | Elazar | G06Q 30/02 348/207.1 |
| 2011/0307736 | A1* | 12/2011 | George | G06F 17/30519 714/6.2 |
| 2012/0149302 | A1 | 6/2012 | Sekiya | |
| 2012/0158998 | A1 | 6/2012 | O'Shea | |
| 2012/0167063 | A1* | 6/2012 | Detwiler | G06F 9/4401 717/140 |
| 2012/0284473 | A1 | 11/2012 | Hsu et al. | |
| 2013/0198726 | A1* | 8/2013 | Smith | G06F 8/40 717/136 |
| 2014/0281333 | A1 | 9/2014 | Peterson et al. | |
| 2014/0351830 | A1 | 11/2014 | Schnellinger et al. | |
| 2015/0106784 | A1* | 4/2015 | Tzubary | G06F 8/36 717/109 |
| 2016/0085480 | A1 | 3/2016 | Chiu et al. | |
| 2017/0060442 | A1 | 3/2017 | Dunn | |
| 2017/0149931 | A1 | 5/2017 | Lochhead et al. | |
| 2018/0107499 | A1 | 4/2018 | Trantham et al. | |

OTHER PUBLICATIONS

John et al., Active Storage using Object-Based Devices, published by ieee, 2008 pp. 472-478 (Year: 2008).*

Riedel et al., Active disks for Large-Scale Data Processing, published by IEEE, 2001, pp. 68-74 (Year: 2001).*

Lim et al., Active Disk File System: A Distributed, Salable File System, published by IEEE Computer Society, 2003, pp. 101-116 (Year: 2003).*

Qin et al., Active Storage Framework for Object-based Storage Device, published by IEEE Computer Society, 2006, pp. 1-5 (Year: 2006).*

Uysal et al., Evaluation of Active Disks for Large Decision Support Databases, Proceedings Sixth International Symposium on High-Performance Computer Architecture. HPCA-6 (Cat. No. PR00550), published by IEEE, pp. 1-16 (Year: 1999).*

Office Action for U.S. Appl. No. 15/378,983, dated Apr. 30, 2018, 18 pages.

Final Rejection from U.S. Appl. No. 15/378,983, filed Dec. 14, 2016, including PTO-892, dated Oct. 17, 2018, 21 pages.

Final Rejection for U.S. Appl. No. 15/378,983, dated Jul. 5, 2019, 24 pages.

Office Action for Korean Patent Application No. 10-2017-0133554, dated Aug. 8, 2019, 17 pages.

Non-Final Rejection for U.S. Appl. No. 15/378,983, dated Jan. 24, 2019, 21 pages.

"Java API and Simulator for the Kinetic Open Storage Platform" from https://github.com/Kinetic/kinetic-java downloaded on Dec. 14, 2016.

"Kinetic Protocol" from https://github.com/Kinetic/kinetic-protocol downloaded on Dec. 14, 2016.

"Active Disks for Large-Scale Data Processing" IEEE Computer, Jun. 2001.

"Active Disk Architecture for Databases" Technical Report CMU-CS-00-145, May 2000.

"Data Mining on an OLTP System (Nearly) for Free" Proceedings of the 2000 ACM SIGMOD International Conference on Management of Data, Dallas, TX, May 2000.

"Active Disks—Remote Execution for Network-Attached Storage" Technical Report CMU-CS-99-177, Doctoral Dissertation. Pittsburgh, PA, Nov. 1999.

"Active Storage for Large-Scale Data Mining and Multimedia" Proceedings of the 24th International Conference on Very Large Databases (VLDB '98), New York, NY, Aug. 1998.

"Active Disks: Remote Execution for Network-Attached Storage" CMU-CS-97-198, Dec. 1997.

"Active Disks for Databases," NSIC/NASD Workshop on Network Storage for Databases: Asset, Apathy, or Albatross?, Millbrae, CA, Aug. 17, 1999.

"Active Disks—Remote Execution for Network-Attached Storage," Systems Seminar, University of California—Berkeley, Berkeley, CA, Oct. 8, 1998.

"Active Storage for Large-Scale Data Mining and Multimedia," 24th International Conference on Very Large Databases (VLDB '98), Vision Paper, New York, NY, Aug. 24, 1998.

"Active Disks for Large-Scale Data Mining and Multimedia," NSIC/NASD Workshop: What is to be done with lots more computing inside storage?, Oakland, CA, Jun. 8, 1998.

"Active Disks for Large-Scale Data Mining and Multimedia," SIGMOD '98—Data Mining and Knowledge Discovery Workshop, Seattle, WA, Jun. 5, 1998.

"Active Storage for Large-Scale Data Mining and Multimedia," Center for Automated Learning and Discovery (CALD) Seminar, Carnegie Mellon University, Apr. 3, 1998.

"Active Disks—A Case for Remote Execution in Network-Attached Storage," Parallel Data Systems Retreat, Nemacolin, PA, Oct. 29, 1997.

"Active Disks: Programming Model, Algorithms and Evaluation" (1998) by Anurag Acharya, Mustafa Uysal and Joel Saltz.

Mok et al., "Efficient Run-Time Monitoring of Timing Constraints", published in Proceeding RTAS '97 Proceedings of the 3rd IEEE Real-Time Technology and Applications Symposium (RTAS '97), p. 1-11 (Year: 1997).

Baker et al., "GridRM: A Resource Monitoring Architecture for the Grid", published by Springer-Verlag Berlin Heidelberg 2002, pp. 268-273 (Year: 2002).

(56) References Cited

OTHER PUBLICATIONS

Non-Final Rejection for U.S. Appl. No. 15/378,983, dated Dec. 9, 2019, 22 pages.
Non-Final Rejection for U.S. Appl. No. 16/129,520, dated Oct. 10, 2019, 17 pages.

* cited by examiner

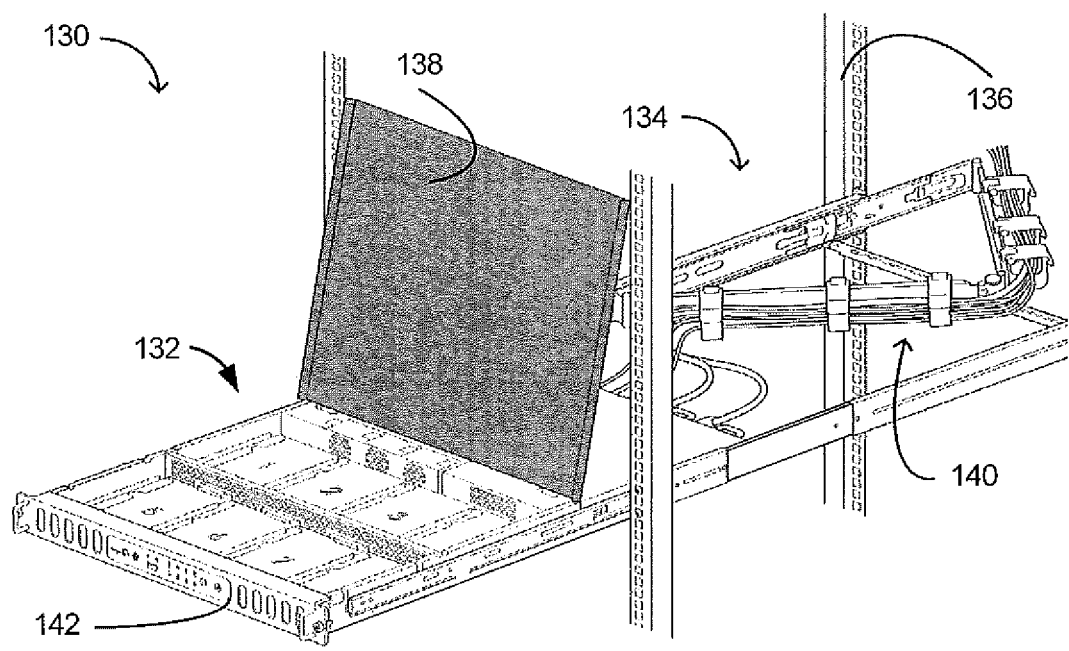
FIG. 1AAA

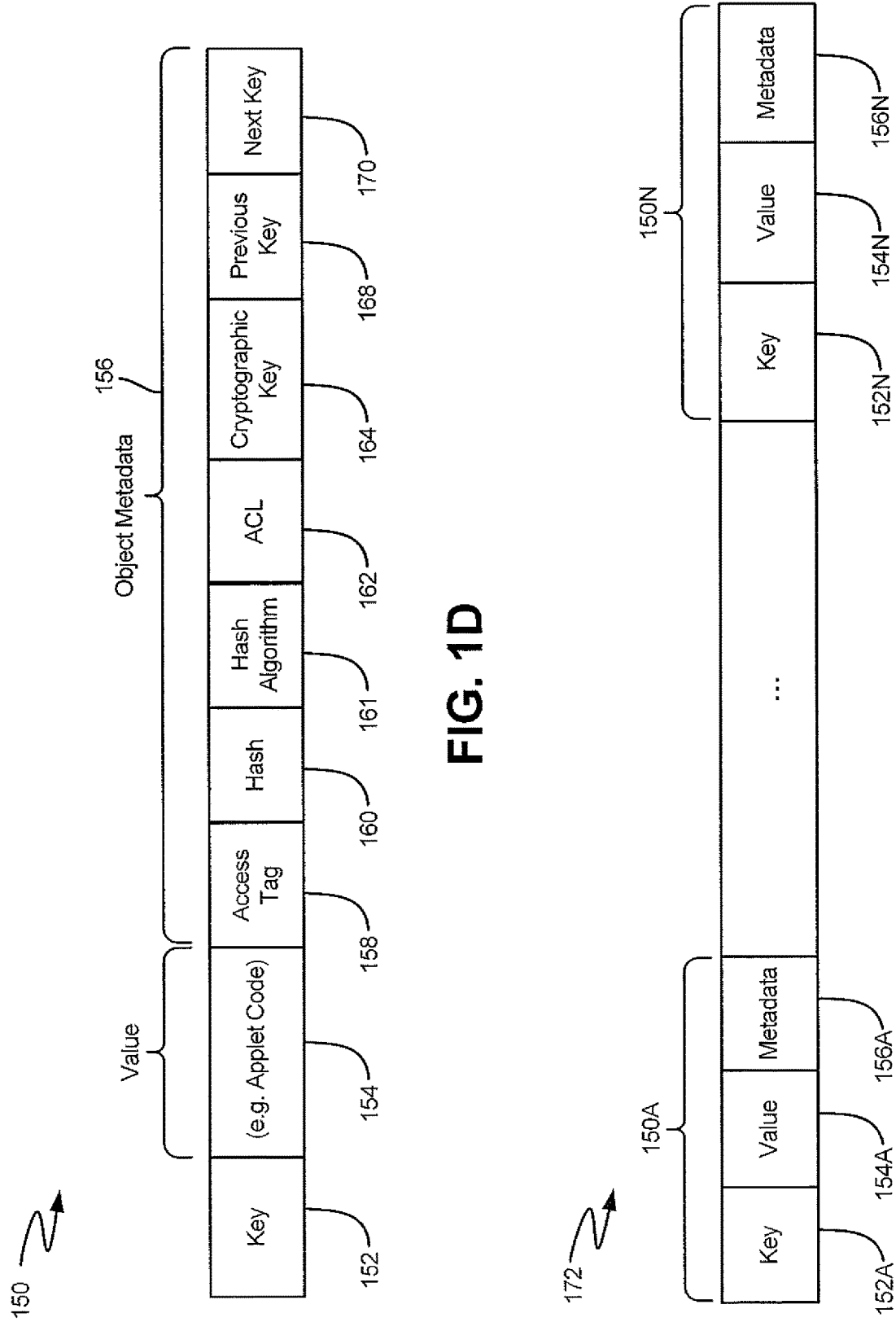

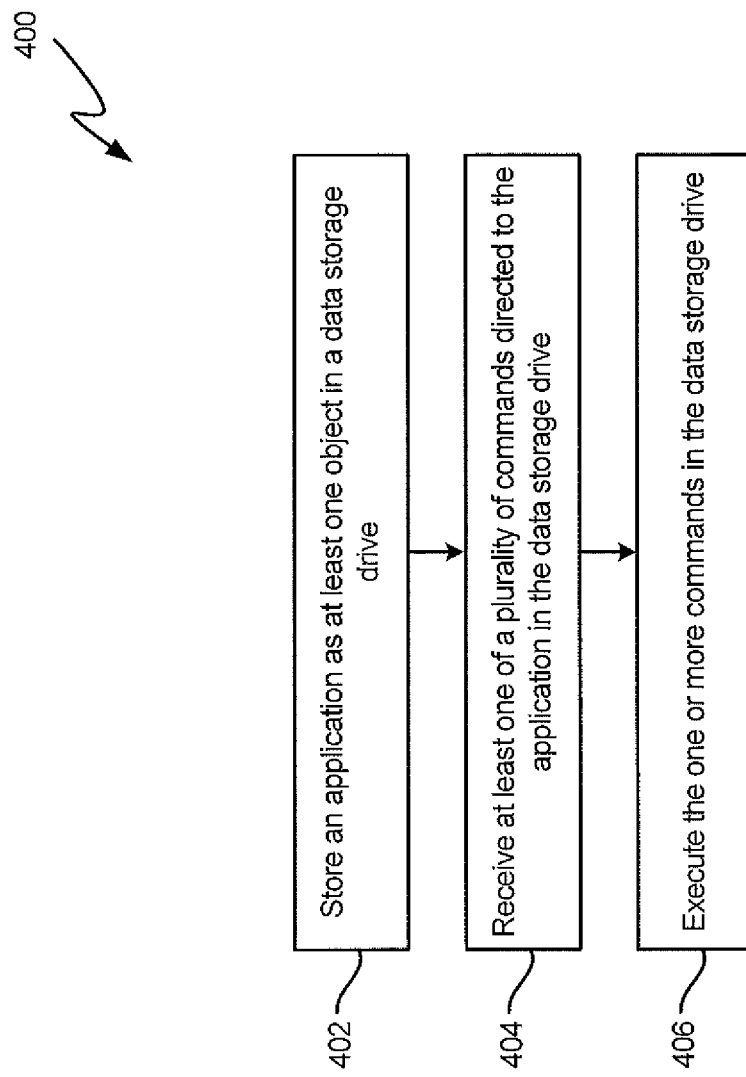

ACTIVE DRIVE API

CROSS-REFERENCE TO RELATED APPLICATIONS

This utility patent application claims the benefit of U.S. Provisional Patent application No. 62/408,446, filed on Oct. 14, 2016, the entire content of which is hereby incorporated by reference, and this utility patent application makes reference to U.S. patent application Ser. No. 15/378,983, filed on even date herewith, which published as U.S. Publication No. 2018/0107499 A1, published on Apr. 19, 2018, the entire content of which is hereby incorporated by reference.

BACKGROUND

Data storage drives are typically included in systems having one or more host computers. Examples of data storage drives include hard disk drives (HDDs), which are electromechanical devices containing spinning disks and movable read/write heads, solid state drives (SSDs), which use memory chips and contain no moving parts, and hybrid drives, which combine features of HDDs and SSDs in one unit.

In current systems, data are read and sent from a data storage drive to a host computer. Data are then processed within the host's computation environment.

SUMMARY

The present disclosure relates to an application programming interface (API) that enables installation and execution of applications on a data storage drive.

In one embodiment, the API (referred to herein as an Active Drive API) enables installation of an application as one or more key-value objects on the data storage drive and enables the execution of the application within a controlled environment of the data storage drive.

This summary is not intended to describe each disclosed embodiment or every implementation of the Active Drive API. Many other novel advantages, features, and relationships will become apparent as this description proceeds. The figures and the description that follow more particularly exemplify illustrative embodiments.

BRIEF DESCRIPTION OF THE DRAWINGS

FIG. 1AA is an exploded view of a data storage drive in accordance with one embodiment.

FIG. 1AAA is a perspective view of a portion of a storage rack including a storage compartment in which multiple data storage drives may be installed.

FIG. 1D is a block diagram illustrating an example structure of an object that may be stored in a data storage drive in the systems of FIGS. 1A through 1C.

FIG. 1E is a block diagram illustrating an example structure of an applet object that may be stored, installed and executed in a data storage drive in the systems of FIGS. 1A through 1C.

FIG. 4 is a flow diagram of a method embodiment.

DETAILED DESCRIPTION

Embodiments described below relate to an application programming interface (API) that enables installation and execution of applications on a data storage drive. The API, which is referred to herein as an Active Drive API, enables installation of an application (e.g. an applet or small application) as one or more key-value objects on the data storage drive and enables the execution of the applet within a controlled environment of the data storage drive. Prior to providing details regarding commands of the object-based Active Drive API, a description of an illustrative operating environment is provided below.

Figure 1A:
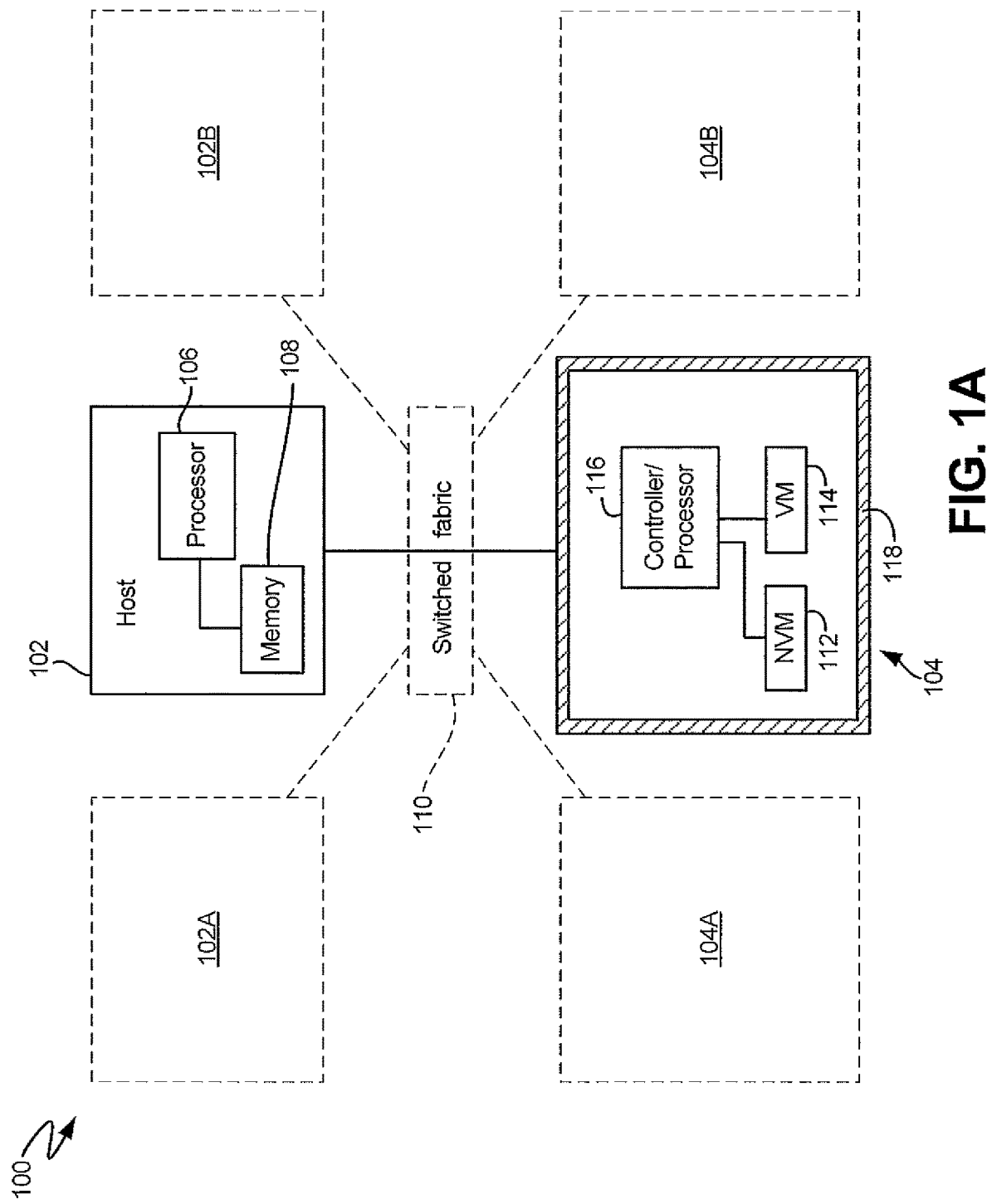
FIG. 1A is a block diagram of an illustrative operating environment of a system in which an Active Drive application programming interface (API) may be employed.
Figure 1A:
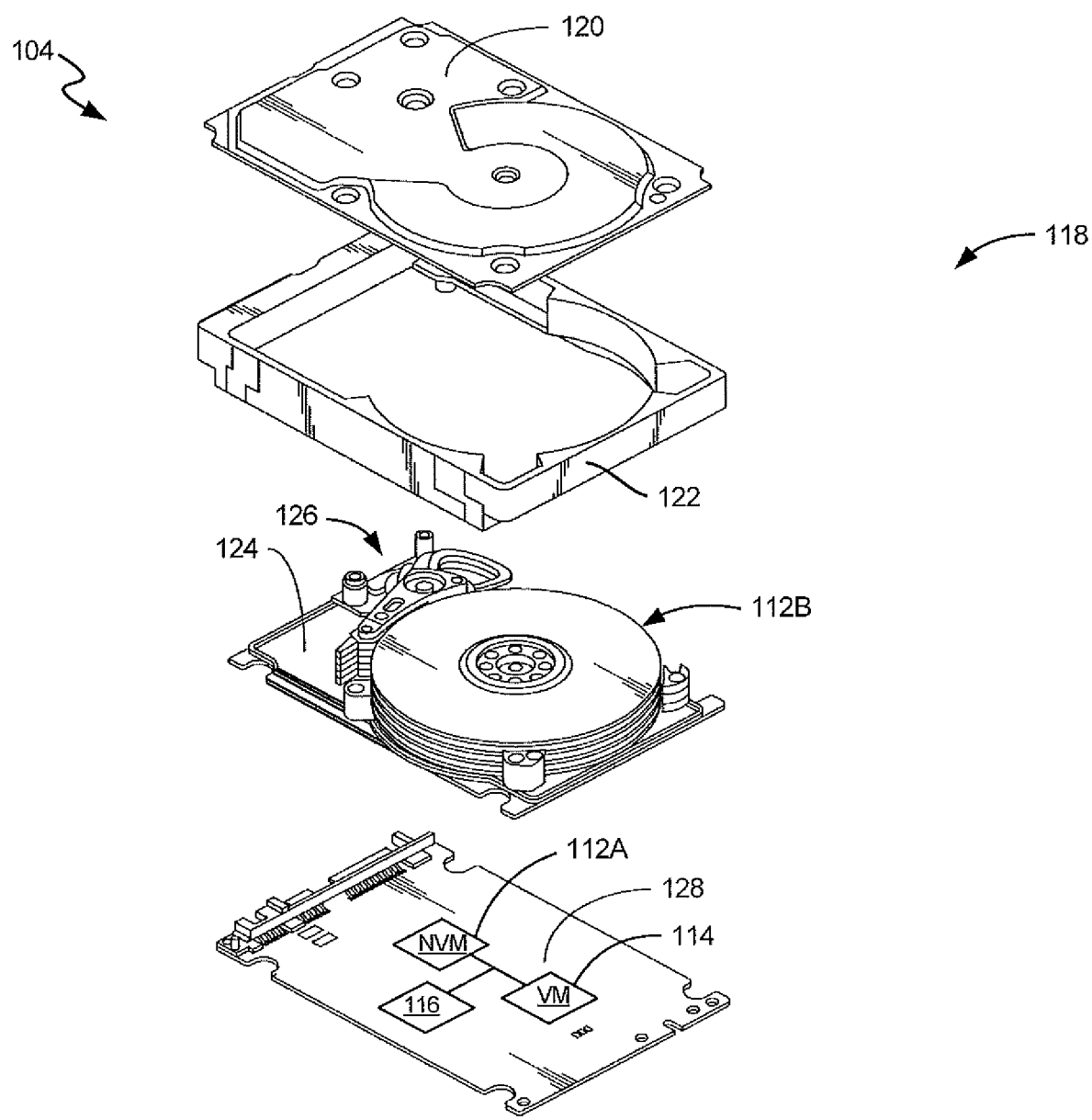

FIG. 1A shows an illustrative operating environment in which certain specific embodiments disclosed herein may be incorporated. The operating environment shown in FIG. 1A is for illustration purposes only. Embodiments of the present disclosure are not limited to any particular operating environment such as the operating environment shown in FIG. 1A. Embodiments of the present disclosure are illustratively practiced within any number of different types of operating environments. It should be noted that the same reference numerals are used in different figures for same or similar elements.

FIG. 1A depicts a system 100 that may include at least one host 102 and at least one data storage drive (DSD) 104. The host 102 is generally an electronic device with computing capability that utilizes separately stored data to perform one or more tasks. The host 102 may also be referred to as the host system or host computer. The host 102 can be one or more computers or similar electronic devices, such as a supercomputer, a desktop computer, a laptop computer, a server, a tablet computer, a communication system, a music player, another electronic device, or any combination thereof. Host 102 may include a processor 106 (e.g. a central processing unit) and a memory 108 (e.g. a system memory that includes read only memory (ROM), random access memory (RAM), etc.), which is communicatively coupled to processor 106. Computer-executable instructions may be stored in memory 108 before being executed by processor 106.

As indicated earlier, DSD 104 may be a hard disk drive (HDD), which is an electromechanical device containing spinning data storage disks and movable read/write heads, a solid state drive (SSD), which uses electronic memory chips (e.g. one or more solid-state Flash memory chips) and contains no moving parts, or a hybrid drive, which combines features of HDDs and SSDs in one unit. Thus, DSD 104 may include nonvolatile media 112 (e.g. one or more data storage disks, one or more Flash memory chips, StRAM, RRAM, 3D XPoint memory, etc.), volatile memory 114 such as random access memory, and one or more processors 116. In some embodiments, the processors 116 may be augmented by specially-designed coprocessing circuitry (not shown) to better perform specific computationally-complex tasks, such as floating point math, erasure coding, encryption, pattern searching, etc. Computer-executable instructions may be stored on nonvolatile media 112 and in volatile memory 114 before being executed by the processor(s) 116. The processor(s) 116, nonvolatile media 112 and volatile memory 114 are used to perform the DSD's basic storage operations (e.g. storing user data) and also include firmware and software that provide an application-execution environment within DSD 104. The nonvolatile media 112, the volatile memory 114 and the processor(s) 116 are contained in a mechanical assembly, such as casing 118. In some embodiments, host 102 and DSD 104 may both be part of a single unit, such as a storage rack (e.g. the entire DSD 104 with its casing 118 is installed within a storage enclosure also containing host 102). In other embodiments, DSD 104 and host 102 may be spaced apart, and DSD 104 may even be remotely located from the host 102. One example of a DSD 104 having a casing such as 118 is briefly described below in connection with FIG. 1AA.

FIG. 1AA provides an exploded view of a HDD 104 with an example casing or housing 118. As shown, the housing 118 includes a top cover 120, a base-deck frame 122 and a base-deck floor 124. In the embodiment shown in FIG. 11A, base-deck frame 122 and base-deck floor 124 are two separate pieces. However, in other embodiments, base-deck frame 122 and base-deck floor 124 may be a single piece. The housing 118, including the base-deck frame 122, base-deck floor 124 and the top cover 120, may adhere to any of a number of different form factors, including, for example, the 2.5" and 3.5" form factors for HDDs. The housing 118, in combination with HDD internals 126 and a logic board 128 provide the HDD 104. As can be seen in FIG. 1AA, processors 116, first nonvolatile media 112A, and volatile memory 114 are included on board 128. First nonvolatile media 112A may comprise electronic memory that may be used as a nonvolatile cache memory in some embodiments. Storage disks, which are a part of HDD internals 126, constitute second nonvolatile media 112B, which together with first nonvolatile media 112A make up nonvolatile media 112 (of FIG. 1A).

Referring back to FIG. 1A, it is seen that there may be multiple DSDs (e.g. 104, 104A, 104B, etc.) in a system such as 100. The multiple DSDs 104, 104A, 104B, etc., which may each be separately housed in a casing such as 118 shown in FIG. 1AA, may be installed in a storage rack. One example of a storage rack is briefly described below in connection with FIG. 1AAA.

FIG. 1AAA provides a perspective view of a portion of a storage rack 130 including a storage compartment 132 in which multiple DSDs (e.g., 104, 104A, 104B, etc.) of the type shown in FIGS. 1A and 1AA may be installed. As illustrated, storage rack 130 may include a rail assembly 134 that enables the storage compartment 132 to be drawn out of rack 136 (e.g., 19-inch rack), and a storage compartment cover 138 may be raised providing easy access to storage compartment 132. The storage compartment 132 may include a number of bays for a number of DSDs (e.g., 104, 104A, 104B, etc., of FIG. 1A) such as HDDs (e.g., 3.5-inch HDDs), SSDs, hybrid drives, etc. As further illustrated in FIG. 1AAA, rail assembly 134 may further include a cable management system 140 for managing one or more cables connected to an appropriate electrical connector or hardware interface on a motherboard at a rear end (opposite a faceplate 142) of the storage compartment 132. In the embodiment of FIG. 1AAA, any of DSDs 104, 104A, 104B, etc., of FIG. 1A, which may wear out or malfunction during the expected system lifetime, may be easily replaced by a technician.

As described earlier in connection with the embodiments of FIGS. 1A and 1AA, the processor(s) 116, nonvolatile media 112 and volatile memory 114 are contained within housing 118 of an individual DSD 104 and perform both the DSD's basic storage operations and provide an application-execution environment within DSD 104. However, in some embodiments (shown in FIGS. 1B and 1C), components within housing 118 (e.g. processor(s) 116, nonvolatile media 112 and volatile memory 114) may primarily be configured to provide basic storage operations, and an application-execution component 117 may be included outside housing 118 to provide an application-execution environment for applets that may utilize data within DSD 104. The application-execution component 117 may include a combination of one or more microprocessors, memory and firmware that enables installation and execution of applets. In such embodiments, application-execution component(s) 117 may be included within a storage compartment such as 132 (of FIG. 1AAA), which houses a plurality of DSDs. It should be noted that application-execution component 117 is not a part of any host computer.

Figure 1B:
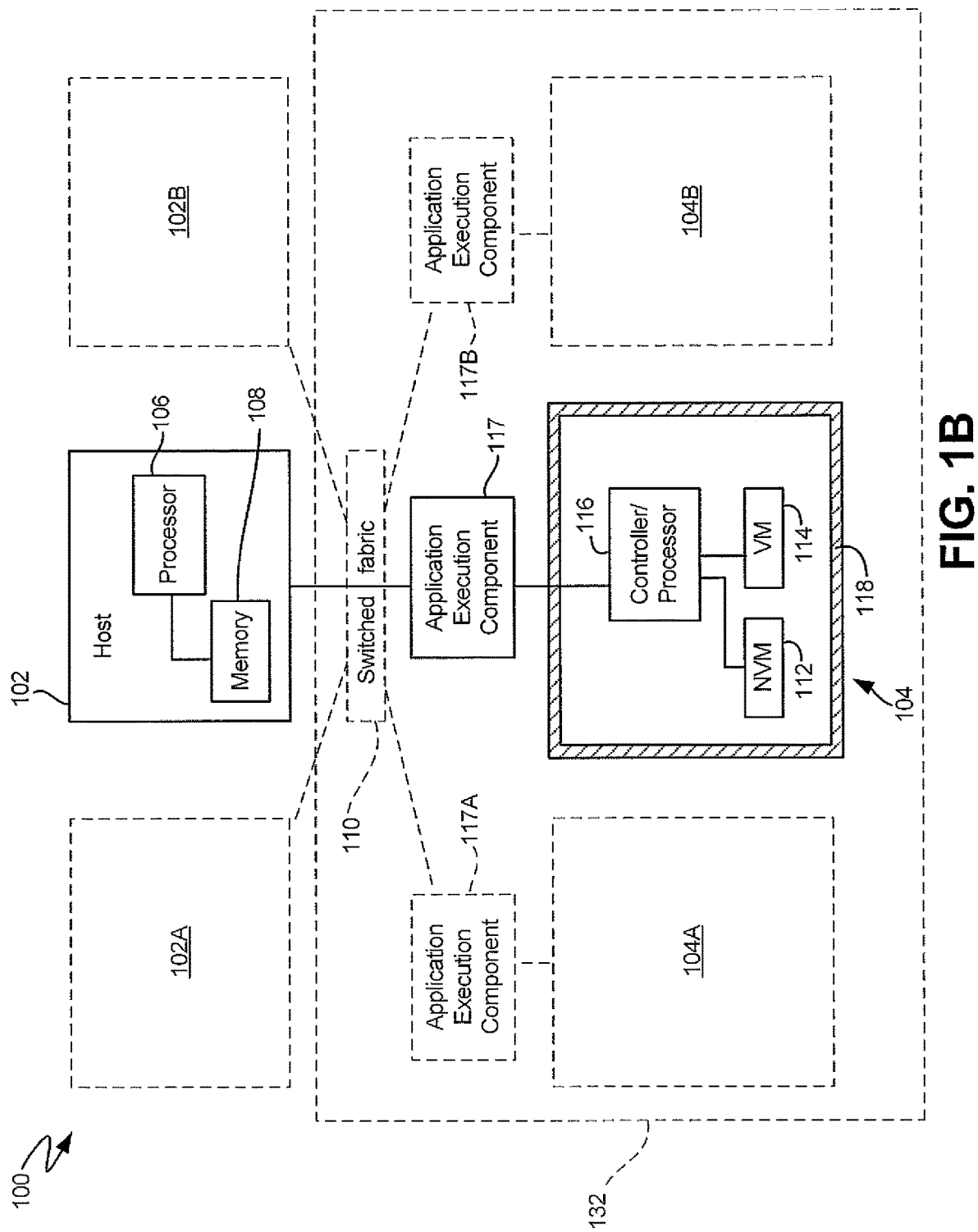
FIG. 1B is a block diagram of another illustrative operating environment of a system in which an Active Drive API may be employed.

In some embodiments, a separate application-execution component may be coupled to each individual DSD. Such an embodiment is shown in FIG. 1B. In the embodiment of FIG. 1B, application-execution component 117 is coupled to DSD 104 via a suitable interface and provides an application-execution environment for applets stored within DSD 104. Similarly, application-execution component 117A is coupled to DSD 104A and application-execution component 117B is coupled to DSDs 104B. Components 117A and 117B provide application-execution environments for applets stored within DSDs 104A and 104B, respectively.

Figure 1C:
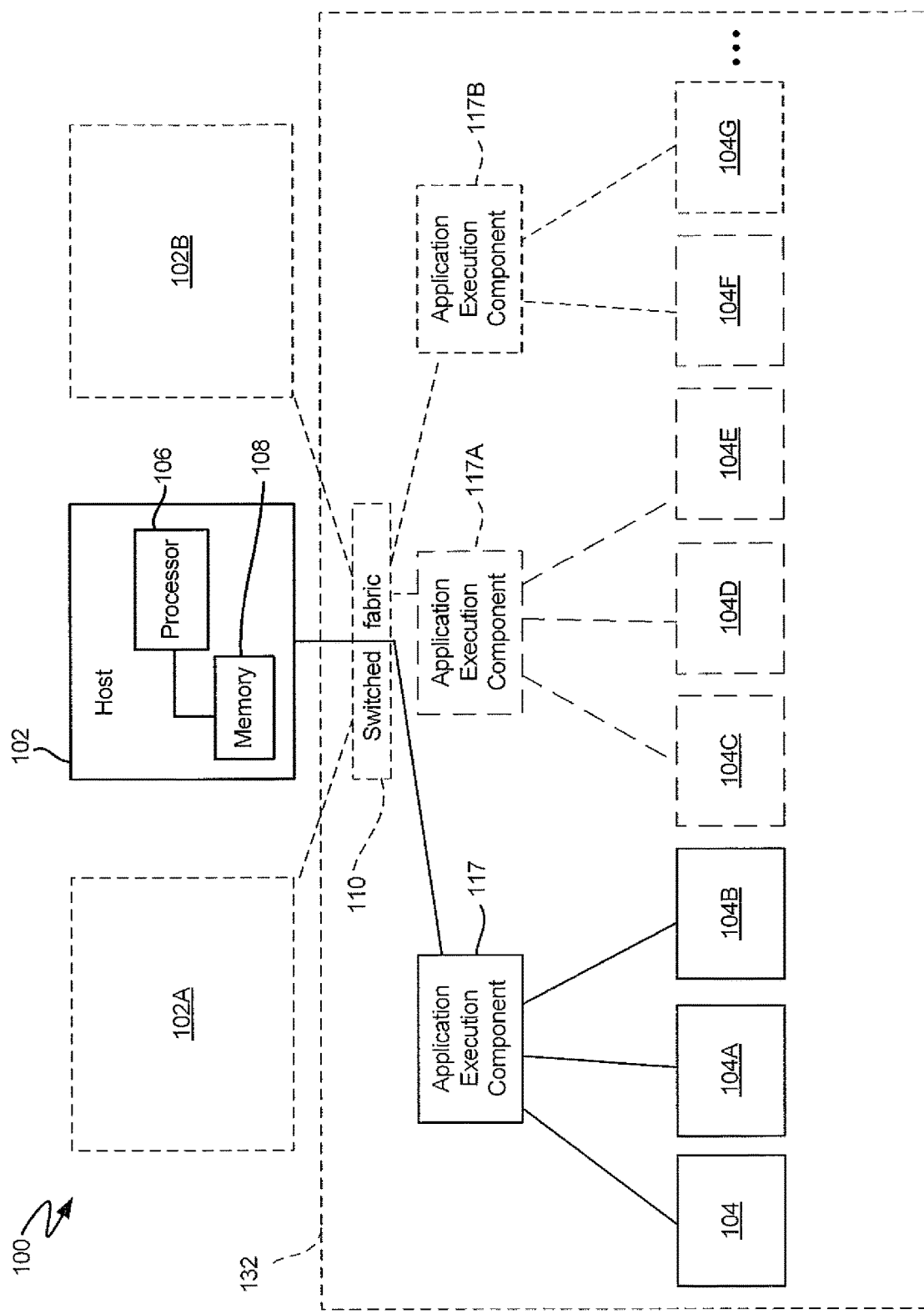
FIG. 1C is a block diagram of yet another illustrative operating environment of a system in which an Active Drive API may be employed.

In an alternate embodiment, one application-execution component may be coupled to multiple DSDs. Such an embodiment is shown in FIG. 1C. In the embodiment of FIG. 1C, application-execution component 117 is coupled to DSDs 104, 104A and 104B, application-execution component 117A is coupled to DSDs 104C, 104D and 104E, and application-execution component 117B is coupled to DSDs 104F and 104G. In this embodiment, application-execution component 117 provides an application-execution environment for applets stored within DSDs 104, 104A and 104B. Similarly, applets stored in DSDs 104C, 104D and 104E can be executed by application-execution component 117A, and applets stored in DSD 104F and 104G can be executed by application-execution component 117B.

In general, for the above-described embodiments, any suitable optical, wired, or wireless connection techniques may be utilized to connect the different components of system 100. In some embodiments, a network switched fabric (denoted by reference numeral 110 in FIGS. 1A, 1B and 1C) may be included to provide communication amongst the different components. In the interest of simplification, example connection techniques are described below for the configuration shown in FIG. 1A, and do not include a description of connections to application-execution component 117 of FIGS. 1B and 1C. However, it should be noted that the examples provided below also apply to the configurations shown in FIGS. 1B and 1C.

As indicated above, the host 102 and DSDs 104, 104A, 104B, etc., may be connected by way of an optical, wired, or wireless connection, for example by a local area network (LAN) or wide area network (WAN). In some embodiments, DSD 104 may be connected to multiple host computers 102, 102A, 102B, etc., by way of a LAN or WAN. An example may include an Ethernet network allowing access by multiple clients simultaneously. In some embodiments, the DSDs 104, 104A, 104B, etc., may connect to the hosts 102, 102A, 102B, etc., over one or more interfaces simultaneously. For example, DSDs 104, 104A, 104B, etc., may have multiple Ethernet interfaces to connect to hosts 102, 102A, 102B, etc. In other embodiments, DSDs 104, 104A, 104B, etc., may have a single interface connected to multiple hosts such as 102, 102A and 102B. For example, switched fabric 110 may be used to regulate access between multiple hosts 102, 102A and 102B. Devices, such as the DSD 104 and hosts 102, 102A, 102B, etc., may have Internet Protocol (IP) addresses that can be accessed locally or over an internet. In some embodiments, the DSD 104 may be able to access other DSDs 104A, 104B, etc., on the network in addition to host devices 102, 102A and 102B.

Conventional storage interfaces, such as SAS, SATA, and NVMe may also be used to communicate between host 102 and DSD 104. Mixtures of interfaces and protocols are possible. For example, SCSI commands may be sent to and from a host 102 over an Ethernet network, to an Ethernet port attached to a processor via a PCIe bus (not shown). The processor may then send the commands onwards over a PCIe bus to a SAS host bus adapter, which sends the command over a SAS link to DSD 104.

In embodiments of the disclosure, applets that originate from host 102 may be stored in DSD 104. As will be described in detail further below, each of the applets may be organized as a set of key-value objects. The set of key-value objects (e.g. one or more key-value objects that constitute the application) is referred to herein as an applet object. Both key-value objects and applet objects are described in detail further below.

DSD 104 (of FIG. 1A) and application-execution component 117 (of FIGS. 1B and 1C) support an Active Drive API. As will be described in detail further below, host 102 utilizes the Active Drive API to install and execute the applet object(s) in DSD 104 (of FIG. 1A) and in application-execution component 117 (of FIGS. 1B and 1C). Although, in some embodiments, the Active Drive API is object-based, the use of an object-based API is not limiting. For example, in alternate embodiments, DSD 104 may use files or linked lists of logical block addresses instead.

Examples of interfaces over which host 102 and DSD 104 may communicate to store and execute applet objects include an Ethernet, SAS, SATA, or PCIe connection. In some embodiments, Active Drive API commands may be translated or encapsulated into other command protocols, such as SAS, SATA, NVMe, etc., by a translation or shim layer or bridge controller (not separately shown in FIGS. 1A, 1B and 1C). In other embodiments, the Active Drive API commands can be converted directly into low-level operations to control the DSD 104 functions. Prior to providing details regarding the Active Drive API commands, contents of an example key-value object and applet object are described below.

FIG. 1D depicts an example of fields that may be associated with a key-value object, which may be referred to herein simply as an "object." Each object 150 may comprise a key 152, which identifies the object. Object 150 may also comprise a value 154, which may be data associated with the key received from a client or host (e.g. user data, executable application code or intermediate object code). Object 150 may also comprise metadata 156, which may include a set of attributes associated with the object 150, identify access rights, or identify other nearby objects for example.

The metadata 156 may include fields such as an access tag or "version" field 158 used to control access to the object 150, which can keep the object synchronized when multiple clients may have simultaneous access with asynchronous connections. In some embodiments, an object's metadata 156 may also include a hash 160 of the object code, a hash algorithm 161 used to create the hash 160, cryptographic keys 164, an access control list (ACL) 162 to designate access rights (e.g. to designate which clients can access the object), identifiers for a next 170 or previous 168 object, e.g. according to a collation order based on the values of the keys, or other related information.

As specified, an access control list (ACL) may limit which clients or hosts can access an object, and may limit the performance of any action at all by a client or a host on an object. In some embodiments, an ACL may be maintained for each object, listing the clients or hosts with access permissions. In some embodiments, DSD 104 may maintain an ACL for each client or host designating which key ranges or objects the client or host has access to. In some embodiments, DSD 104 may maintain ACLs linking clients or hosts and associated accessible objects.

As noted above, the set of key-value objects that constitutes the applet is referred to herein as an applet object. FIG. 1E is a diagrammatic illustration of one example of an applet object 172. In the Example shown in FIG. 1E, applet object 172 is a sequence of N key-value objects. A first of the N key-value objects is denoted by 150A and includes key 152A, value 154A and metadata 156A. The last or $n^{th}$ key-value object is denoted by 150N and includes key 152N, value 154N and metadata 156N. Keys 152A through 152N may be generated in any suitable manner. For example, in some embodiments, each key 152A, . . . , 152N may be independently generated. In other embodiments, keys other than first key 152A may be generated by, for example, adding a suitable suffix to key 152A. In some embodiments, an algorithm may utilize first key 152A as an input and generate the remaining keys as a function of the first key 152A. Based on the key generation technique used, applet object 172 may be known or identified by a list of all the keys 152A through 152N, or be identified by first key 152A, which may serve as a root or handle for the applet object 172.

As noted earlier in connection with FIG. 1D, an ACL may limit which clients or hosts can access an object. Since applet object 172 may include multiple objects, each of the multiple objects 150A thorough 150N, may include either the same ACL metadata or different ACL metadata. In some embodiments, the ACL for the applet object 172 is dictated by the ACL metadata of the first object 150A of the applet object 172, and the ACL metadata for the remaining objects of the applet object 172 are ignored. In an alternate embodiment, the ACL metadata of all objects 150A through 150N of the applet object 172 are taken into consideration to determine host or client access to the applet object 172. In a particular embodiment, access to the applet object 172 is limited to hosts or clients that have access to every one of objects 150A through 150N of the applet object 172. In general, any suitable technique may be utilized to control host or client access to the applet object 172.

Examples of how the ability to store and execute applications in DSDs may be employed in a computing environment to help address a customer's need for storing information and managing its storage are described below in connection with FIGS. 2A and 2B.

Figure 2A:
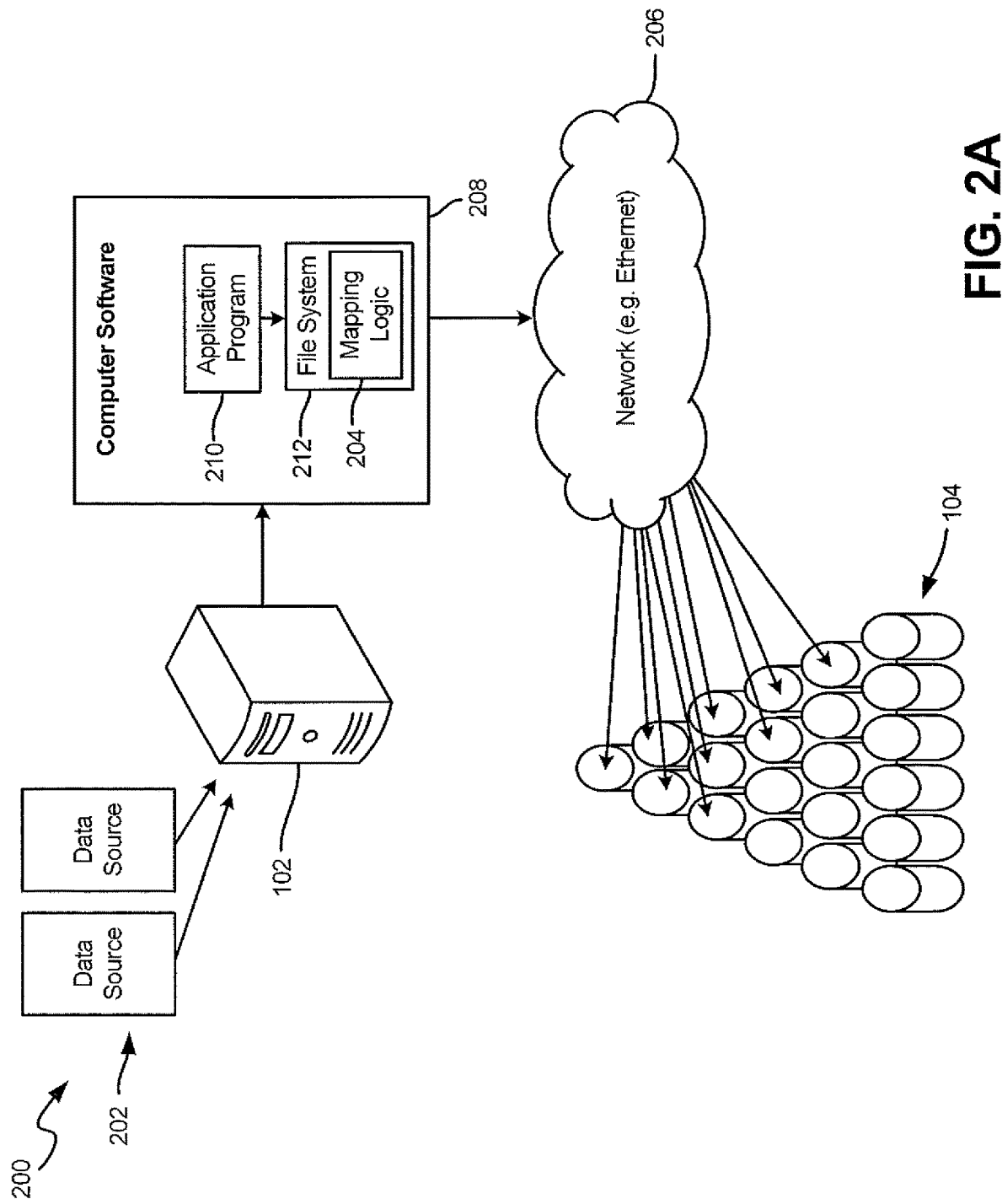
FIGS. 2A and 2B are diagrams of an illustrative embodiment of a system employing Active Drive API commands.
Figure 2B:
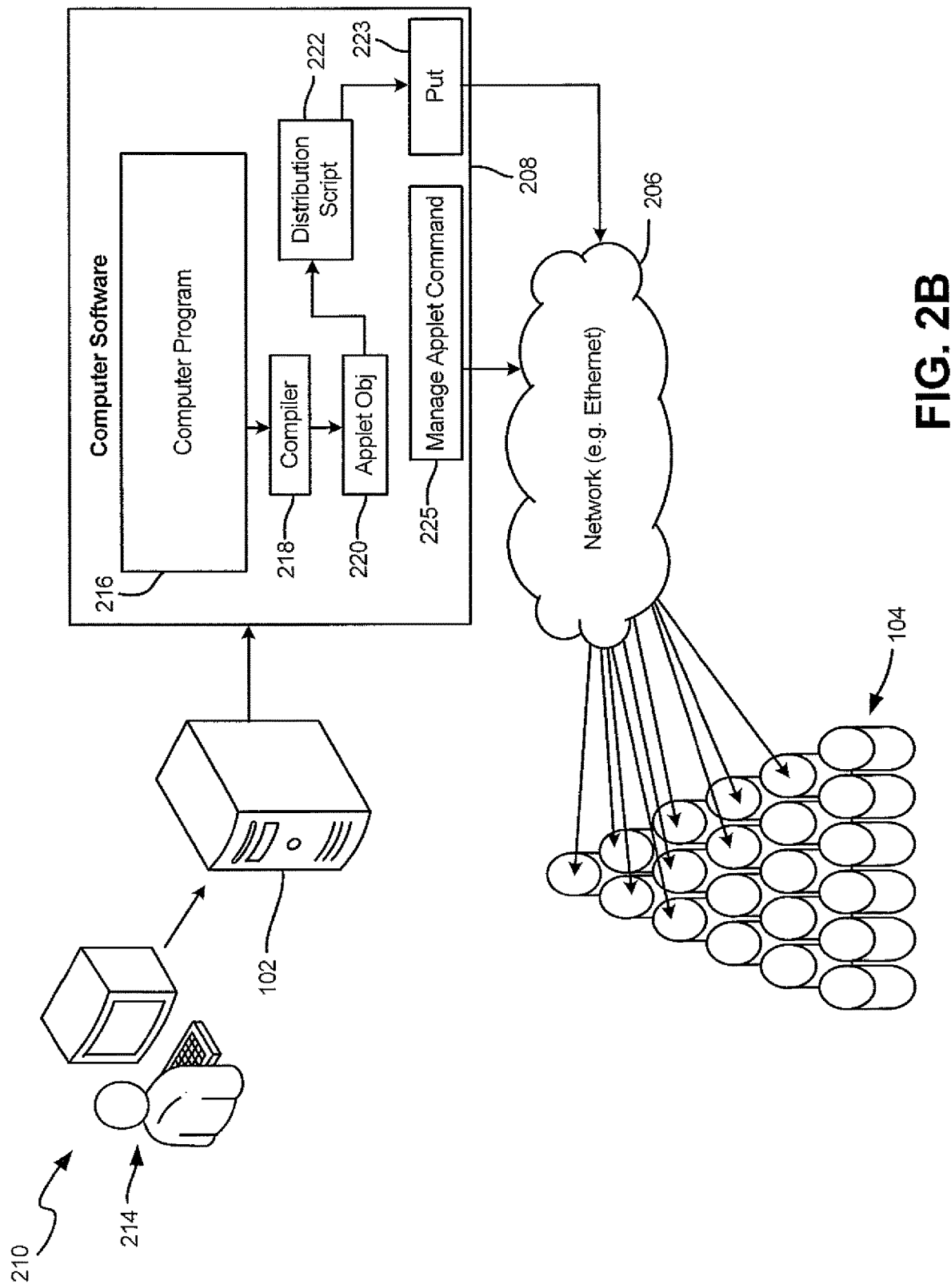

FIG. 2A depicts an example embodiment of a system 200 employing Active Drive API commands. As can be seen in FIG. 2A, system 200 includes one or more data sources 202 (e.g. cash registers at a department store, airline reservation systems, telecommunication switching equipment, sensors, etc.), host computer 102 to which the one or more data sources 202 are attached, a network (e.g. Ethernet) 206 and a pool of DSDs 104, which are connected to host computer 102 via network 206. It should be noted that, although all DSDs 104 are shown as physically proximate, they may be physically stored in separate enclosures or even separate building locations.

During operation, host computer 102 receives data from data source(s) 202 and writes the data to a file or object. More specifically, host computer 102 includes computer software 208 having an application program 210 that writes the data to the file or object. Computer software 208 additionally includes a file system or object storage system 212 that converts the data into one or more key-value objects. Examples of object storage systems suitable for use in element 212 include CEPH® produced by Inktank storage Inc., and SWIFTSTACK® produced by SwiftStack Inc. System 212 also includes mapping logic 204 for linking different objects to particular ones of DSDs 104. File system or object storage system 212 identifies one or more target DSDs 104 for storage of the object(s). File system 212 then stores the object(s) in the respective identified DSD(s) 104 using a storage command (e.g. a "Put" command, which is described further below). It should be noted that objects may be stored with redundancy, such as RAID or erasure coding, to protect against possible DSD component failure. The data stored in the form of key-value objects may then be analyzed in any suitable manner. One data analysis example is provided in connection with FIG. 2B.

An owner of data (denoted by reference numeral 214 in FIG. 2B) may wish to perform processing on many data in parallel, for example, to find out how many items were sold on a particular day (e.g. Monday) and after a particular time (e.g. after 5 PM) on that day. The data owner 214 may write a computer program to perform a query and total the sales data. That program is shown within computer software 208 and is denoted by reference numeral 216. The owner 214, with the help of a compiler 218, compiles the program 216 into an intermediate object file, which is referred to as an applet object and is denoted by reference numeral 220. An example of a compiler suitable for element 218 is the CLANG™ compiler, developed by the University of Illinois, Apple Inc., and others. The applet object 220 can be distributed to some or all of DSDs 104 holding data for processing. In the embodiment of FIG. 2A, a computer program or script (referred to as a distribution script and denoted by reference numeral 222) distributes the applet object 220, using Put commands 223, to all of DSDs 104 holding data for processing. The distribution script 222 may initiate execution of the applet object 220 via an applet management command of the Active Drive API commands (e.g. a Manage Applet Execute command, which is described further below). In one embodiment, the applet is executed in a low-level interpreter virtual machine, such as LLVM® from the University of Illinois/LLVM Foundation Corporation, within the DSD's processor(s) 116 (of FIG. 1A) or within application-execution component 117 (of FIGS. 1B and 1C), and libraries bound to the low-level interpreter virtual machine can provide the application with access to local data stored within the DSD. A computer program or a user may monitor execution status or obtain execution status information via another applet management command 225 of the Active Drive API commands (e.g. a Manage Applet Get Process Status command, which is described further below).

Results of the computer program may be stored locally (e.g. as key-value objects) on the respective DSD(s) 104, sent to one or more calling computers (e.g. host computer 102), sent to one or more different ones of DSDs 104, etc. For example, the storage of the key-value objects including the results may carried out by executing Put commands within the respective DSD(s) 104 to store the results locally. In another example, the applet may include instructions to execute Put commands that store locally-generated key value object(s) including the results to non-local DSDs 104. In yet another example, once execution of the applet is complete, the results produced by the applet may be sent to a set of different nodes (e.g., hosts and/or DSDs) via a notification message to a Uniform Resource Indicator (URI), which includes identification information (e.g. Uniform Resource Locators (URLs)) for the set of different nodes that are intended recipients of the results. In some embodiments, a response message sent by the respective DSD(s) 104 upon execution of a Manage Applet Active Drive API command (e.g., a response to a Manage Applet Execute command) may include an indicator of results. Details of Active Drive API commands are provided below in connection with FIGS. 3A-3E.

Figure 3A:
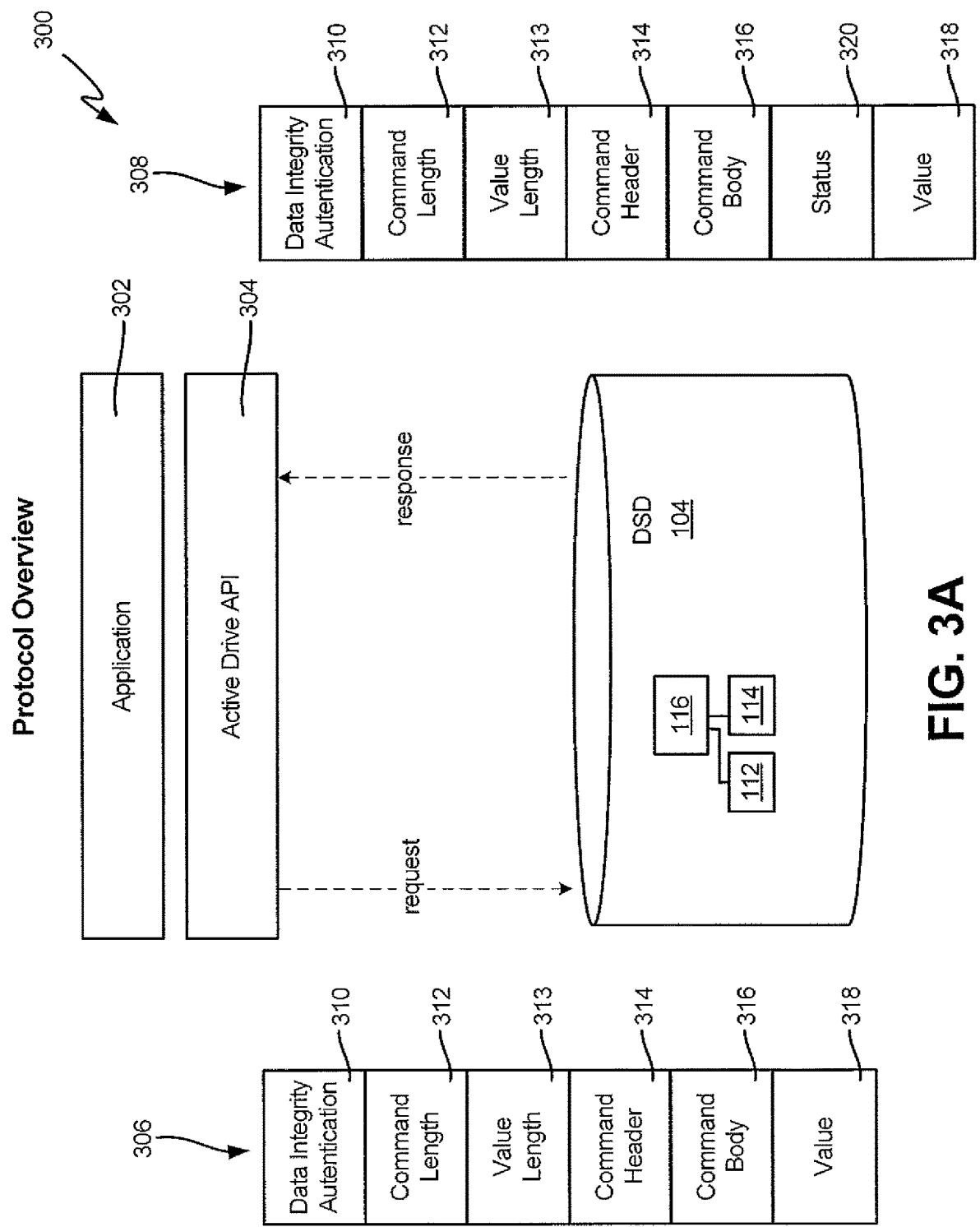
FIGS. 3A-3E are diagrammatic illustrations showing examples of Active Drive API commands.

FIG. 3A is a simplified block diagram illustration of a system 300 employing Active Drive API command sets and functions in accordance with one embodiment. It should be noted that the Active Drive API is an application level protocol that may be placed on a transport layer (e.g. Transmission Control Protocol (TCP) with transport layer security (e.g. Secure Sockets Layer (SSL)).

System 300 includes an application 302, which may be running on a host 102 (not shown in FIG. 3A), an Active Drive API 304 and a DSD 104. It should be noted that only one application 302 and one DSD 104 are shown in FIG. 3A in the interest of simplification, and any additional DSDs, for example, that may be within system 300 are not shown. As indicated earlier, Active Drive API 304 supports functionality that allows application 302 to install an applet as one or more key-value objects on DSD 104 and enables the execution of the applet within a controlled environment of DSD 104. Specifically, such functionality is supported by way of a command set that may include request commands or request messages 306, which may be sent by application 302 to DSD 104, and corresponding response messages 308, which may be sent by DSD 104 to application 302. In some embodiments, commands/messages 306, 308 may have a pre-defined structure, with certain bits having defined logical meanings, such as specifying a type of command and modifiers. In other embodiments, commands/messages 306, 308 may be otherwise structured, such as having bits identifying a meaning or field for a number of following bits, so that unused potential fields may not be included in a command/message 306/308. In some embodiments, Protocol Buffers, such as GOOGLE® Protocol Buffers from Google Inc., may be used for data (e.g. user data, intermediate object code and/or executable application code) communication. In some embodiments, data (e.g. user data, intermediate object code and/or executable application code) in commands/messages 306/308 may be structured using variant data types.

In FIG. 3A, example request message/request command 306 includes a data integrity/authentication field 310, a command length field 312, a value length field 313, a command header 314, a command body 316 and an applet value or applet data field 318. These different fields are described briefly below.

In some embodiments, data integrity/authentication field 310 may be utilized to transmit a keyed-hash message authentication code (HMAC) involving a cryptographic hash function in combination with a secret cryptographic key. Thus, in such embodiments, field 310 may be used to simultaneously verify both data integrity and authentication of a message. In general, field 310 may be utilized to include any suitable data integrity/authentication information.

Command length fields 312 may be utilized to include, for example, a number of bytes in the request message/command 306. In general, command length field 312 may include any suitable indicator of the length of the request message/command 306. Similarly, value length field 313 may include a length of the data included in the applet value field 318.

Command header 314 may be utilized to transmit identification information related to the command. For example, command header 314 may include information that indicates to DSD 104 that the command relates to storage of the applet, management of the applet, etc. Examples of different types of commands are described further below in connection with FIGS. 3B-3E. In general, such information may identify a type of operation to be performed by DSD 104 when it receives the command.

Command body 316 may include information that identifies the applet. For example, command body 316 may include one or more keys that identify objects that constitute that applet. Command body 316 may also include any parameters that may be needed to execute the command.

Applet value field 318 may include intermediate object code and/or executable application code. The applet value field may be of any size. In request messages/commands 306 that relate to carrying out actions on applet objects that are already stored on DSD 104, applet value field 318 may have a null-sized value of 0 bytes.

As indicated above, each request message/command 306 may have a corresponding response message 308. Response message 308 may include information acknowledging the request message/command 306 and status information indicating, for example, whether the command was executed successfully in DSD 104. As can be seen in FIG. 3A, a structure of response message 308 may be similar to the structure of request message/command 306. However, response message 308 may additionally include a status code field 320 that is utilized by DSD 104 to include the command status information. In the interest of brevity, a description of the fields that are common to both messages 306 and 308 is not repeated.

It should be noted that, in some embodiments, the command set of the Active Drive API may also include modifiers to the commands, such as qualifiers to modify the behavior of the commands, additional commands related to management or monitoring of DSD 104, or other modifiers. A qualifier may be an indicator of a variation of an operation to perform, a sub-operation to perform, an additional operation to perform, or any combination thereof.

Figure 3B:
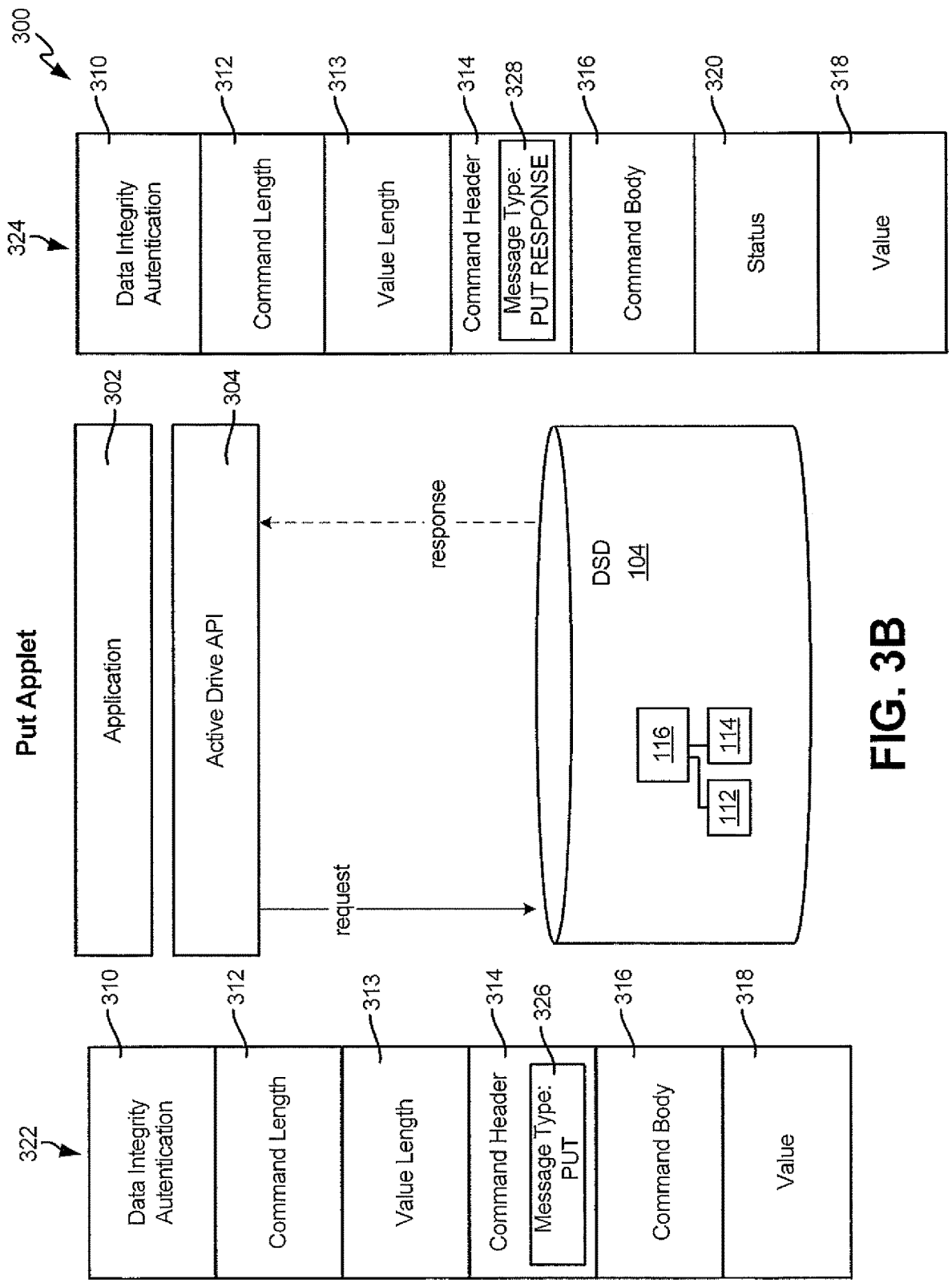

FIG. 3B is a simplified block diagram of system 300 illustrating a Put request message/command 322 and a corresponding response message 324. As indicated above, Put commands may be used to store data (e.g. user data, intermediate object code and/or executable application code) to DSD 104, such as by adding key-value objects to a set of objects stored by DSD 104. As can be seen in FIG. 3B, Put request message/command 322 includes fields that are substantially similar to those shown in FIG. 3A. In the Put request message/command 322, command header 314 may include information that indicates to DSD 104 that the command relates to storage of one or more objects. In FIG. 3B, that identification information is represented by a Put message type 326. Value field 318 includes, for example, intermediate object code for the applet. In Put request message/command 322, command body 316 may include one or more keys that identify the object(s) that constitute that applet. In response to receiving the Put request message/command 322, DSD 104 stores the intermediate object code, for example, in nonvolatile media 112. In should be noted that, prior to storing the intermediate object code in nonvolatile media 112, processor 116 may initially store the intermediate object code in volatile memory 114. Processor 116 may then transfer the intermediate object code from volatile memory 114 to nonvolatile media 112.

As generally described earlier in connection with FIG. 3A, completion of an Active Drive request message/command in DSD 104 may result in a response message being sent from DSD 104 to application 302. Accordingly, as can be seen in FIG. 3B, completion of Put request message/command 322 results in corresponding response message 324 being sent from DSD 104 to application 302. In the response message 324, command header 314 may include information that indicates to application 302 that the message 324 is a response to the Put request message/command 322. In FIG. 3B, that identification information is represented by a Put Response message type 328. The response message 324 is sent to application 302 with a command completion status code 320.

In an example, Put request message/command 322 can complete (e.g. DSD 104 can return response message 324 to application 302 indicating that the associated applet object has been successfully stored) before the information is stored in nonvolatile media 112. For example, DSD 104 may return response message 324 to application 302 indicating completion of Put request message/command 322 once the applet object is received and stored in volatile memory 114. In another example, the Put Applet request/command 322 may include a qualifier (not shown) that instructs DSD 104 to wait until the applet object is stored in nonvolatile media 112 to send response message 324 to application 302. Other variations to Put request message/command 322 may be possible by using different qualifiers.

In general, the applet may be stored as one or more objects in volatile memory 114 and/or nonvolatile media 112 for later execution, or run substantially immediately after being loaded on DSD 104. In order for execution of the applet to be carried out, in one example, objects that constitute the applet may need to be read from volatile memory 114 or nonvolatile media 112, assembled in an executable form, and loaded into an application-execution environment within DSD 104. Applet installation-related functions may be carried out by an Install Applet Active Drive API function in DSD 104. In one example, an Install Applet Active Drive command (not shown) identifying the applet may be sent by application 302 to DSD 104, which performs the Install Applet function in response to receiving the Install Applet command. DSD 104 may send a response to application 302 after the applet is successfully installed. The applet may be ready for execution after application 302 is notified of the successful installation of the applet.

It should be noted that, in some embodiments, once the applet is ready for execution (e.g. assembled in the executable form), the executable form of the applet may be cached in a suitable memory/medium (e.g. nonvolatile media 112 and/or volatile memory 114), and the cached executable applet may be run in DSD 104 on an as-needed basis. Thus, in such embodiments, the Install Applet function does not have to be performed each time the applet needs to be executed. Also, in some such embodiments, as part of the applet-installation process, a user may provide an applet name that is linked to the executable applet in DSD 104. The user-provided applet name may then be employed to invoke the applet. It should also be noted that, in certain embodiments, the applet may be assembled into the executable form outside the DSD 104 (e.g. in host computer 102) and may then be provided to DSD 104 for storage using a suitable command (e.g. a Put command or an Install Applet command).

Figure 3C:
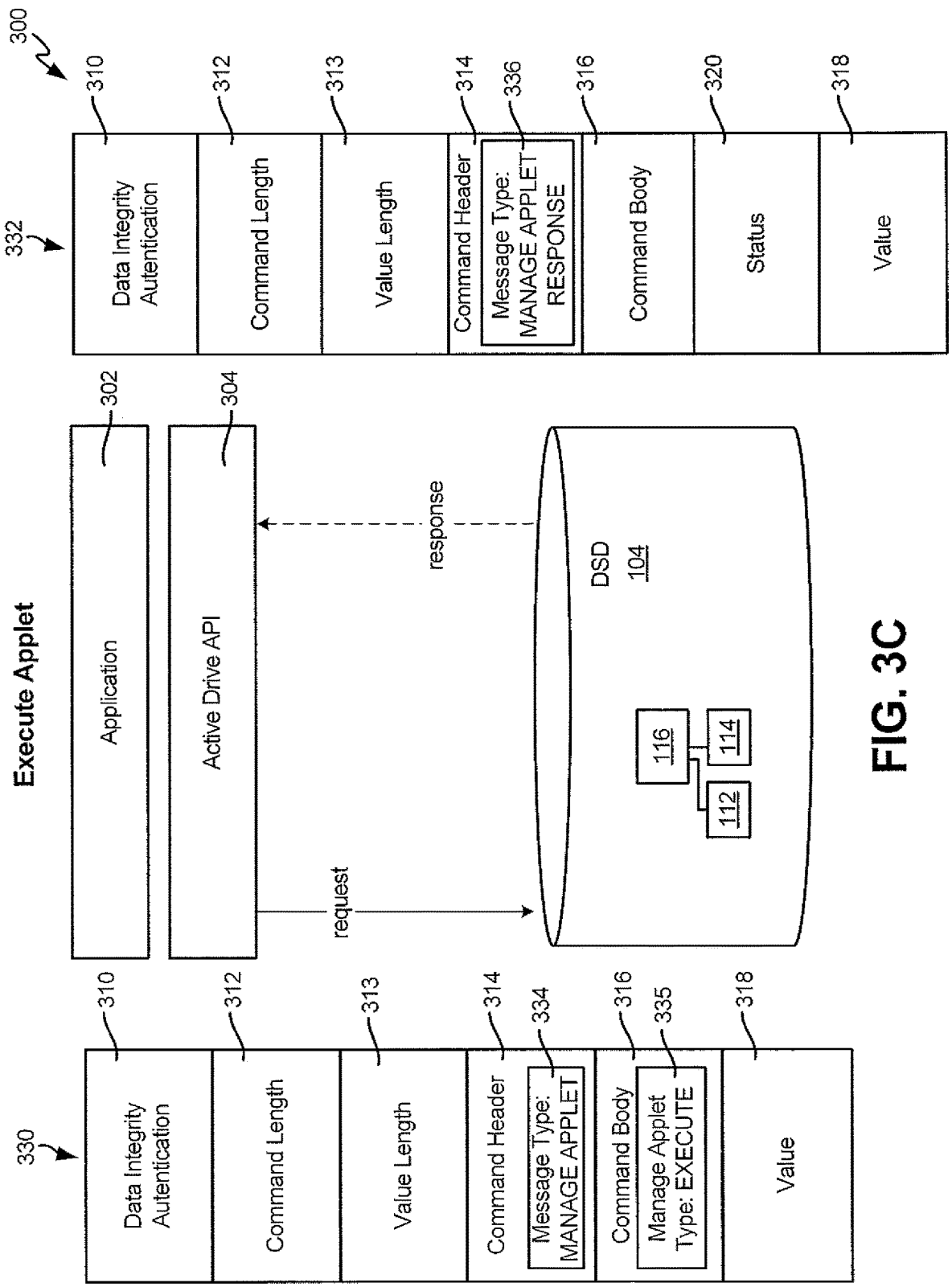

FIG. 3C is a simplified block diagram of system 300 illustrating an Execute Applet request message/command 330 and a corresponding response message 332. As can be seen in FIG. 3C, Execute Applet request message/command 330 includes fields that are substantially similar to those shown in FIGS. 3A and 3B. In the Execute Applet request message/command 330, command header 314 may include information that indicates to DSD 104 that the command relates to management of the applet. In FIG. 3C, that identification information is represented by a Manage Applet message type 334. In Execute Applet request message/command 330, command body 316 may specify that the Manage Applet Message type is an Execute Applet type 335 and may include one or more keys that identify the object(s) that constitute the applet. Alternatively, the Manage Applet Message type, which is the Execute Applet type 335, may include the user-provided applet name to identify the applet. Further, command body 316 may include one or more program parameters to be utilized by the applet during execution. In response to receiving the Execute Applet request message/command 330, DSD 104 runs the executable applet code.

As can be seen in FIG. 3C, completion of Execute Applet request message/command 330 results in corresponding response message 332 being sent from DSD 104 to application 302. In the response message 332, command header 314 may include information that indicates to application 302 that the message 332 is a response to the Execute Applet request message/command 330. In FIG. 3C, that identification information is represented by an Execute Applet Response message type 336. The response message 332 is sent to application 302 with a command completion status code 320.

In addition to the above-described commands and functions, several additional Active Drive API commands and functions related to management of an applet are provided in different embodiments. Examples of some such additional Active Drive API commands and functions are provided below.

A Debug Applet request message/command (not shown) may be sent by application 302 to DSD 104 instructing DSD 104 to invoke a Debug Mode Active Drive API function in DSD 104 for an identified applet. When invoked, the Debug Mode function may load the applet into an application-execution environment within DSD 104 in a form that provides for execution of the applet in a debug mode, and may then execute the applet in that mode. Debug mode is a way of remotely executing an applet with debug features enabled, such as breakpoints, stepping, inspecting variables, etc. that are commonly used for debugging computer programs. This can be done by including debug libraries in the execution environment and establishing a communication channel (or pipe), such as an Internet Protocol (IP) Link, between the execution environment and the host machine's debugging control program (e.g. GDB developed by The GNU project, Eclipse from Eclipse Foundation, etc.). Alternatively, an Execute Applet request message/command 330 with a suitable qualifier (e.g. a program parameter indicating a debug execution mode) may be sent by application 302 to DSD 104 to invoke the Debug Mode function therein. A response message (not shown) may be sent by DSD 104 to application 302 once execution of the applet in debug mode commences or when DSD 104 determines that execution of the applet in debug mode will not start.

An Abort Applet request message/command (not shown) may be sent by application 302 to DSD 104 instructing DSD 104 to invoke an Abort Applet Active Drive API function in DSD 104 for an identified applet that may be running in DSD 104. When invoked, the Abort Applet function may stop execution of the identified applet. A response message (not shown) may be sent by DSD 104 to application 302 after execution of the applet(s) is stopped or if DSD 104 determines that one or more of the applets are not running.

A Get Process Status request message/command (not shown) may be sent by application 302 to DSD 104 instructing DSD 104 to invoke a Get Process Status Active Drive API function in DSD 104 for one or more identified applets (or for applets within an identified key range) that may be running in DSD 104. When invoked, the Get Process Status function obtains/determines current process status information for the identified applet(s). A response message (not shown) including the obtained status information (e.g. information that the applet is running, halted, etc.) may be sent by DSD 104 to application 302.

An Update Applet request message/command (not shown) may be sent by application 302 to DSD 104 instructing DSD 104 to invoke an Update Applet Active Drive API function in DSD 104 for an identified applet. When invoked, the Update Applet function (run by processor 116) may read the identified applet from nonvolatile media 112 or volatile memory 114 and update the applet within the application-execution environment of DSD 104. A response message (not shown) is sent by DSD 104 to application 302 after the applet is successfully validated and updated. The updated applet is then ready for execution in DSD 104.

An Uninstall Applet request message/command (not shown) may be sent by application 302 to DSD 104 instructing DSD 104 to invoke an Uninstall Applet Active Drive API function in DSD 104 for an identified applet. When invoked, the Uninstall Applet function (run by processor 116) may remove the identified applet from the application-execution environment in DSD 104. A response message (not shown) is sent by DSD 104 to application 302 after the applet is successfully removed or if the Uninstall Applet function failed to remove the applet from the application-execution environment.

Figure 3D:
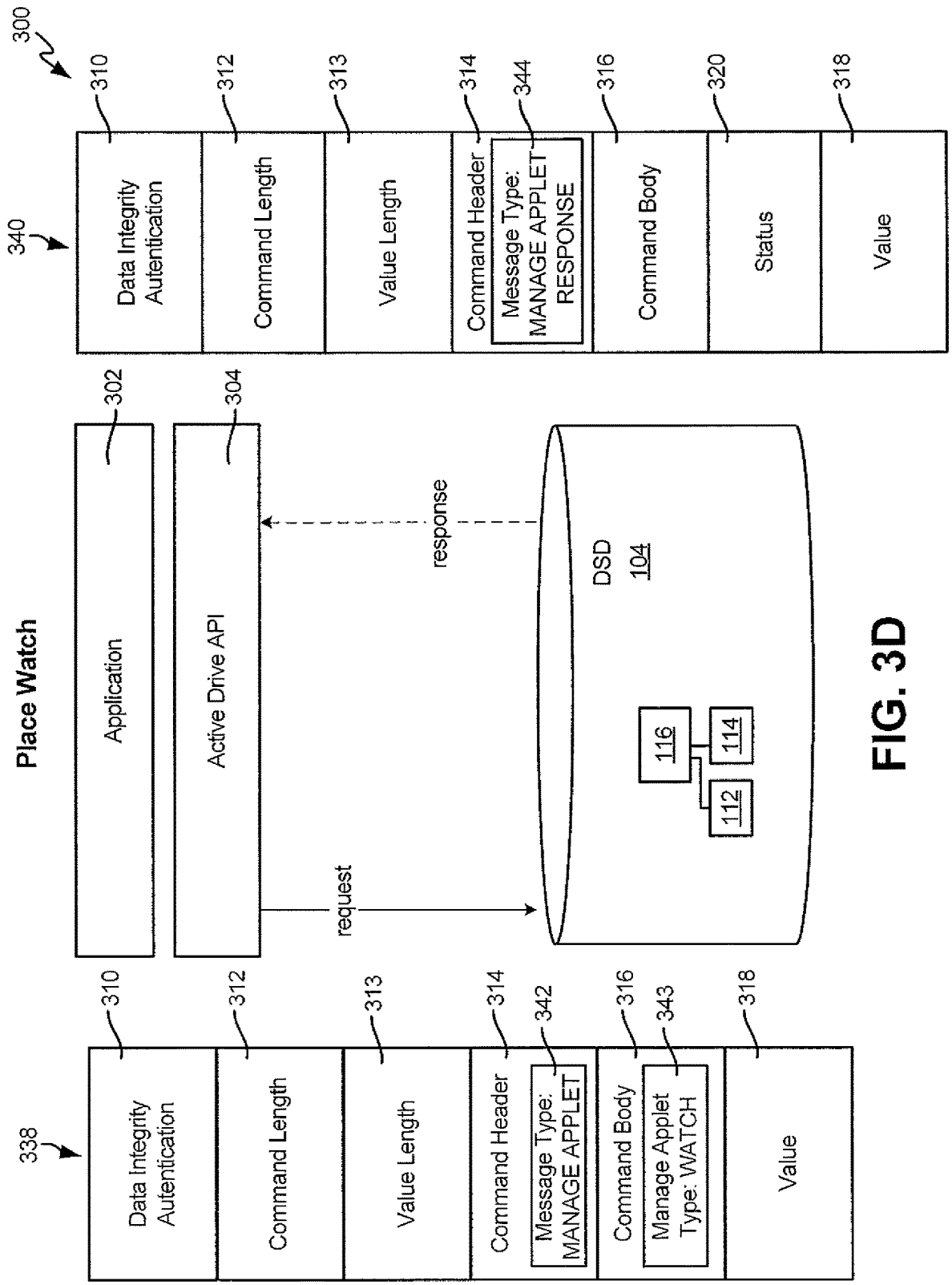

FIG. 3D is a simplified block diagram of system 300 illustrating a Watch Applet request message/command 338 and a corresponding response message 340. As can be seen in FIG. 3D, Watch Applet request message/command 338 includes fields that are substantially similar to those shown in FIGS. 3A, 3B and 3C. In the Watch Applet request message/command 338, command header 314 may include information that indicates to DSD 104 that the command relates to management of the applet. In FIG. 3D, that identification information is represented by a Manage Applet message type 342. In Watch Applet request message/command 338, command body 316 may specify that the Manage Applet Message type is a Watch Applet type 343 and may include one or more keys that identify the objects that constitute the applet(s). Further, command body 316 may identify a watch scope by a start key and an end key, and may also identify message types (e.g. Put). In response to receiving the Execute Watch request message/command 338, DSD 104 registers the applet as a Watcher Applet. A registered Watcher Applet is an applet that is executed upon the occurrence of an event within DSD 104. For example, a Watcher Applet could be registered to execute upon a "GET" operation against any key within a specific range of keys.

Events need not necessarily be directly related to data storage actions. For example, an applet could get invoked whenever the drive temperature exceeds a threshold, or in response to a notification from a drive monitoring program (e.g. when a Self-Monitoring, Analysis and Reporting Technology (SMART) event annunciates), or when drive storage is above a threshold. The Watcher Applet is capable of sending notifications to the host in response to invocation upon the occurrence of a registered event.

As can be seen in FIG. 3D, completion of Watch Applet request message/command 338 results in corresponding response message 340 being sent from DSD 104 to application 302. In the response message 340, command header 314 may include information that indicates to application 302 that the message 340 is a response to the Watch Applet request message/command 338. In FIG. 3D, that identification information is represented by a Watch Applet Response message type 314. The response message 340 is sent to application 302 with a command completion status code 320.

Figure 3E:
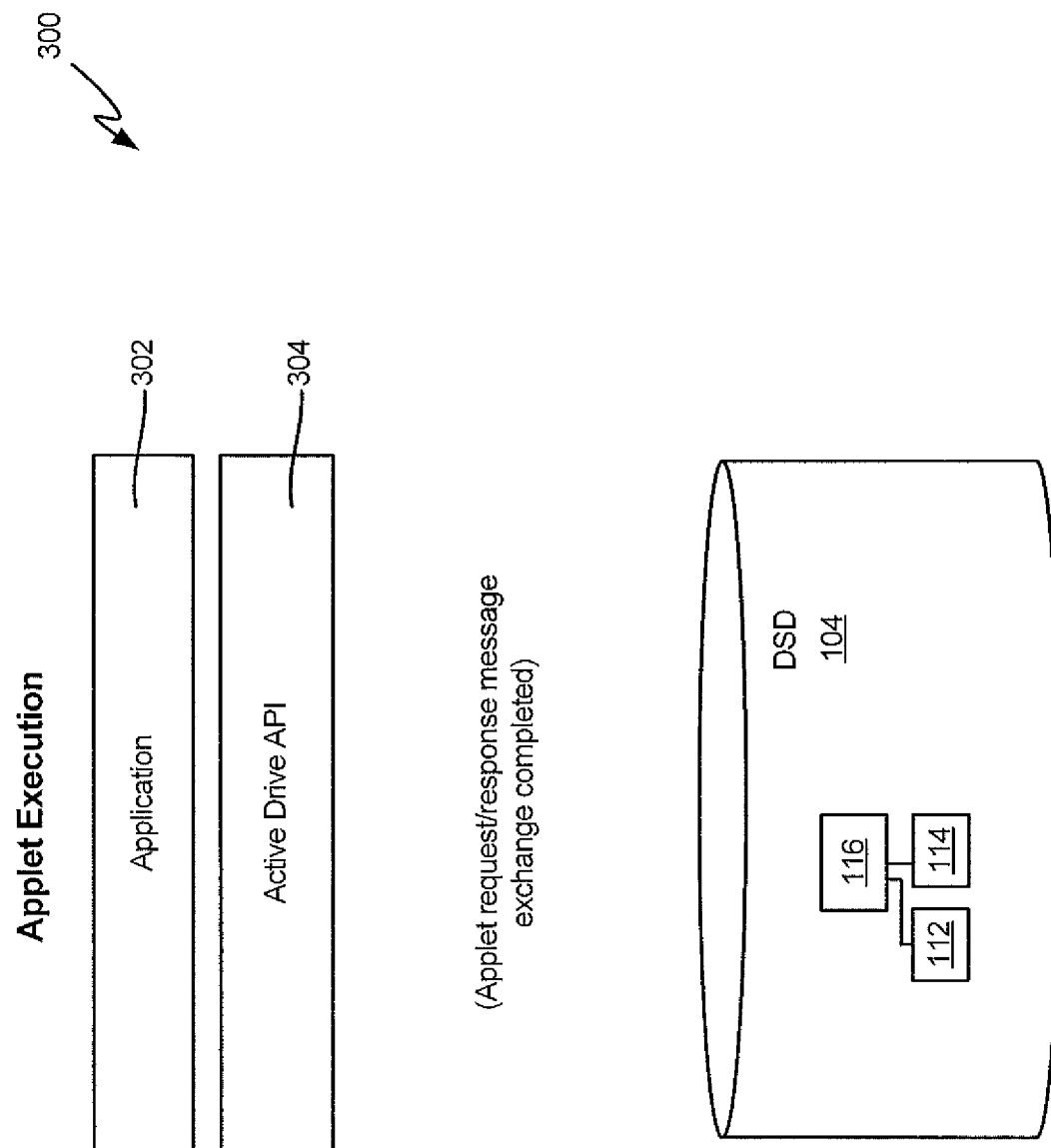

FIG. 3E is a simplified block diagram of system 300 in a state in which application-execution-related request/response message or command exchanges between DSD 104 and application 302 have completed. As noted above, application 302 only exchanges commands (for example, the commands described above in connection with FIGS. 3B-3D) with DSD 104, and the actual execution of the applet is carried within DSD 104 independently of application 302. As noted earlier, results obtained from execution of the applet within DSD 104 may be stored locally on DSD 104, sent to application 302, sent to one or more different ones of different DSDs (not shown in FIGS. 3A-3E) within system 300, etc.

It should be noted that the description provided above in connection with FIGS. 3A through 3E is for an embodiment in which the application-execution environment is within DSD 104. In the embodiments of FIGS. 1B and 1C, for example, the Active Drive API commands may be executed within application-execution component 117, which is coupled to DSD 104.

FIG. 4 is a simplified flow diagram 400 of a method embodiment. At step 402, an application is stored as at least one object in a data storage drive. The at least one object includes a tracking indicator to identify the object and a data field with a variable size to store the application. At step 404, at least one of a plurality of commands directed to the application are received in the data storage drive or in an application-execution component associated with the data storage drive. At step 406, the one or more commands are executed in the data storage drive or in the application-execution component associated with the data storage drive.

In accordance with various embodiments, the methods described herein may be implemented as one or more software programs running on a computer processor or controller, such as the controllers/processors described above. Dedicated hardware implementations including, but not limited to, application specific integrated circuits, programmable logic arrays and other hardware devices can likewise be constructed to implement the methods described herein.

By using the above-disclosed Active Drive API, a host may send a command (e.g. a pattern match) directly to a number of DSDs (for example, 10,000 or more DSDs) simultaneously without involvement from any other direct/intermediate host(s)/servers. The command can then be processed within each DSD without any user data transfers between the host and the DSDs, reducing network traffic and corresponding networking equipment requirements. As a result, one of the benefits is that a majority of data servers, which may be utilized by a conventional system that does not employ an Active Drive API, may be eliminated. For example, in a conventional system that does not employ the Active Drive API, one host may serve 32-100 DSDs. As indicated above, in a system that utilizes the Active Drive API, a single host may serve 10,000 or more DSDs. Further, in systems that employ the Active Drive API, data processing is moved within the DSDs. Accordingly, a majority of data servers/compute cores may be eliminated. Since the processing is distributed rather than aggregated smaller/slower processors can be used. Processing can be embedded within the drive controller ASIC and can share resources, such as DRAM memory, reducing components. Other resulting advantages include improved system performance, better reliability, better fault isolation, reduced system power and a reduced total cost of the system.

Figure 5:
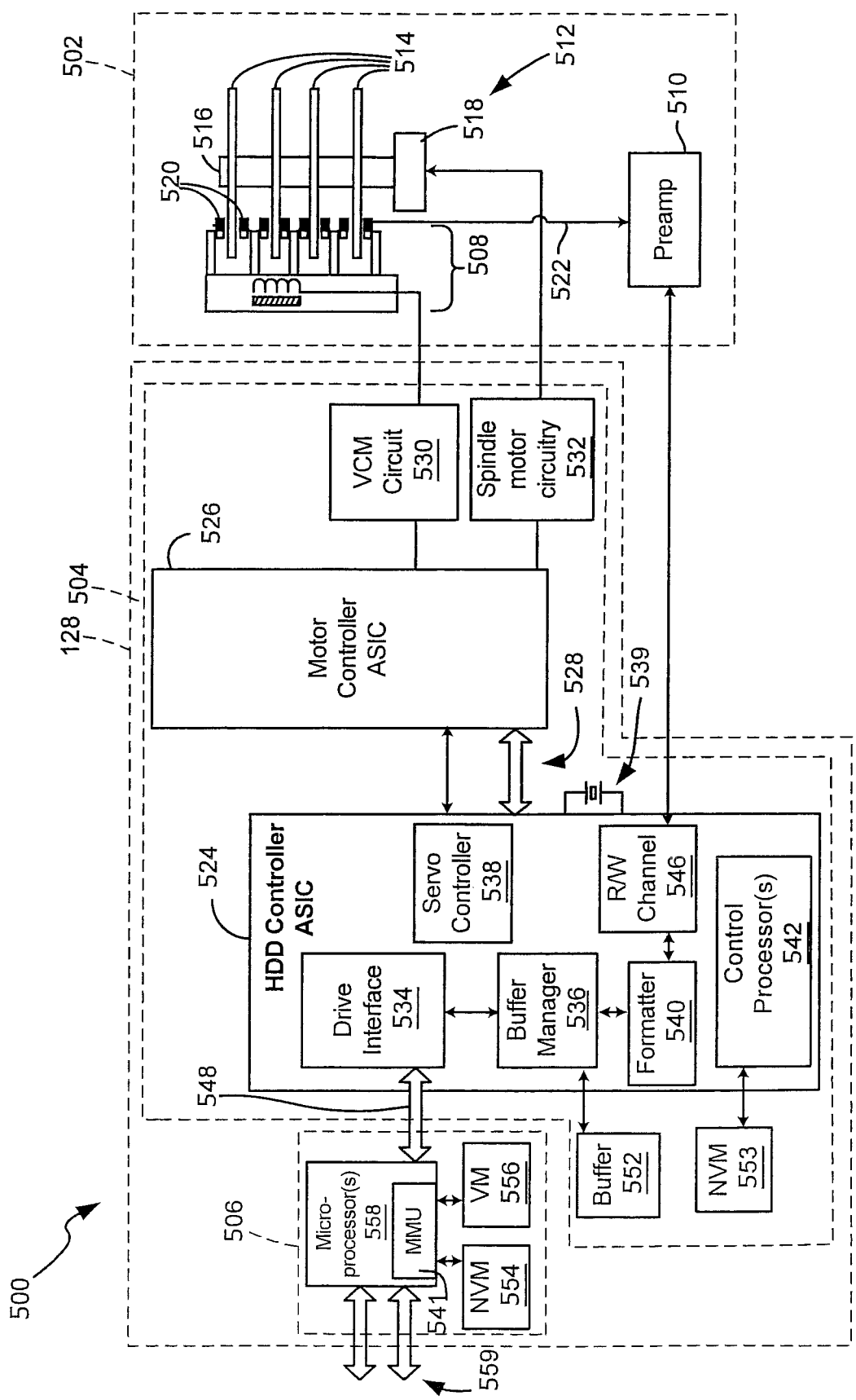
FIG. 5 is a block diagram of an example hard disk drive (HDD) that includes embedded application-execution circuitry in accordance with one embodiment.

FIG. 5 is a block diagram of an example HDD 500 that includes embedded application-execution circuitry in accordance with one embodiment. HDD 500 includes a logic board 128 and a head-disc assembly (HDA) 502. Logic board 128 includes a drive control circuit 504, which helps provide the HDD's basic storage operations, and embedded application execution circuitry 506, which provides an application-execution environment in HDD 500.

HDA 502 includes an actuator assembly 508, a preamplifier 510, and a disc assembly 512. Disc assembly 512 includes one or more media discs 514, stacked on a spindle assembly 516. Spindle assembly 516 is mechanically coupled to a spindle motor 518 for rotating the disc(s) 514 at a high rate of speed.

Actuator assembly 508 includes a voice coil motor (VCM), and multiple actuator arms. Located at the end of each actuator arm are one or more sliders/transducer heads such as 520, which are associated with a respective disc surface. Transducer heads 520 are coupled to preamplifier 510 via any suitable connection element 522.

In the embodiment of FIG. 5, drive control circuit 504 includes a HDD controller application specific integrated circuit (ASIC) 524 and a motor controller ASIC 526 that are coupled together via a connection element 528. VCM drive circuitry 530 and spindle motor drive circuitry 532 are coupled to motor controller ASIC 526.

HDD controller ASIC 524 includes a drive interface 534, a buffer manager 536, a servo controller 538, a formatter 540, control processors 542, and a read/write channel 546. Drive interface 534 may be coupled to a bus connector (e.g., a SATA interface) 548 and communicates, via the bus connector 548, by receiving commands and data from and transmitting status and data back to, for example, embedded application-execution circuitry 506. Drive interface 534 may manage a queue of commands received from a host and/or application execution circuitry 506. Drive interface 534 is connected to buffer manager 536 for transfer of commands, data, and status.

Buffer manager 536 controls a buffer memory 552, which may include volatile and/or nonvolatile electronic memory. Under the control of buffer manager 536, data from buffer memory 532 is provided to formatter 540, which provides the data in a suitable format to read/write channel 546, which communicates with HDA 502 to store the data on disc(s) 514. Also, data read from the disc(s) 514 is provided to formatter 540 via read/write channel 546.

In the embodiment of FIG. 5, control processors 542 execute drive operational programs that may be stored in non-volatile program storage memory 553, such as read-only memory (ROM) or Flash memory. In the interest of simplification, details regarding the drive operational programs are not provided.

Servo controller 538 provides intelligent control of actuator assembly 508 and spindle motor 518 through motor controller ASIC 526. By commands issued to motor controller ASIC 526 by servo controller 538, VCM driver circuitry 530 moves actuator assembly 508 and spindle motor drive circuitry 532 maintains a substantially constant spin rate of spindle motor 518. A crystal oscillator circuit 539 may be included in HDD 500 to provide a substantially stable clock signal for operating HDD 500.

During operation of HDD 500, transducer heads 522 communicate with drive control circuit 504 via preamplifier 510 for reading and writing data to the transducer head's associated disc surface. Preamplifier 510 provides an amplified signal to read/write channel 546 of drive control circuit 504. Read/write channel 546 performs encoding and decoding of data written to and read from the disc(s) 514.

HDD 500 is capable of storing user data as key-value objects and is also capable of storing applet objects. Additionally, HDD 500 provides an environment in which the applet objects may be executed. In the embodiment shown in FIG. 5, such an application-execution environment is provided within HDD 500 by embedded application-execution circuitry 506. Embedded application-execution circuitry 506 includes memory (e.g. electronic memory) for storing firmware and software that includes instructions that support the execution of applications in HDD 500. Further, embedded application-execution circuitry 506 includes one or more processors that execute the instructions stored in the memory within embedded application execution circuitry 506. In the embodiment of FIG. 5, embedded application-execution circuitry 506 includes nonvolatile memory 554 (e.g. Flash memory, 3D XPiont memory, etc.) and volatile memory 556 (e.g. dynamic random access memory (DRAM)), which are both coupled to a microprocessor 558. In a particular embodiment, microprocessor 558 is a dual-core microprocessor. However, in alternate embodiments, other processor core counts, such as single or four-core microprocessors 558, may be employed. In some embodiments, Microprocessor(s) 558 may comprise an embedded-systems Application Processor from ARM Corporation (rather than, for example, a large Intel core) to limit power consumption.

Microprocessor 558 may further comprise a memory management unit (MMU) 541. The MMU 514 provides the ability to limit the range of access to microprocessor resources by a running computer program, such as an applet, via hardware circuitry. As mentioned above, the HDD 500 provides an environment in which an applet object may be executed. The drive's applet management firmware allocates a range of memory for applet execution and configures the MMU 541 to establish that range via circuitry. If the applet attempts to access resources outside of its allocated range, for example due to bugs or in an attempt of malicious hacking, the MMU 541 prevents this access and generates an interrupt to the supervisory program. The supervisory program responds to this interrupt. Responses can include terminating the applet and returning a status message back to the applet's caller indicating that the applet did not complete successfully.

The MMU 541 can also be used for applet memory paging control. For example, the applet supervisor program, using MMU 541, can detect when an applet attempts to access a valid address range, but one that is not currently mapped into volatile memory. The applet supervisor program can then swap pages between volatile memory and disk (or other memory) to provide the applet with an effectively larger memory space (from the applet's perspective).

In the embodiment shown in FIG. 5, embedded application-execution circuitry 506 is coupled to drive control circuit 504 via SATA interface 548. In an alternate embodiment, microprocessor(s) 556 may be incorporated within HDD controller ASIC 524. Such an embodiment eliminates SATA interface 248. As can be seen in FIG. 5, HDD 500 includes one or more interfaces 559 (e.g. Ethernet interfaces) to connect to external devices. In some embodiments, the connection to the external devices takes place via a network.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular embodiment or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments include more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   providing an application programming interface that is an application-level protocol that comprises: a plurality of different commands with each of the plurality of different commands having a pre-defined structure with bit patterns having defined logical meanings that specify a type of command and modifiers for the command, and each of the plurality of commands being communicable by a host simultaneously to a plurality of data storage drives without involvement of any intermediate hosts and servers; and a plurality of different functions capable of being executed in the plurality of data storage drives in response to receiving the plurality of different commands in the plurality of different data storage drives;
   storing, by one or more first commands of the plurality of different commands and one or more first functions of the plurality of different functions of the application programming interface, a user application as at least one object in a data storage drive, the at least one object including: a key to identify the at least one object; and a data field with a variable size to store the user application;
   receiving, in the data storage drive or in an application-execution component associated with the data storage drive that provides an application execution environment, one or more second commands of the application programming interface directly from the host, the one or more second commands being directed to the user application to perform an operation relating to data stored on the data storage drive;
   providing a controlled environment, in the data storage drive or in the application execution environment of the application-execution component associated with the data storage drive, for executing the one or more second commands without involvement of the host based on the bit patterns in the one or more second commands, the controlled environment being capable of limiting memory resources available to the user application when the user application is running in the data storage drive; and
   executing the one or more second commands of the application programming interface in the controlled environment based on the bit patterns in the one or more second commands.

2. The method of claim 1 and wherein storing the user application as at least one object in the data storage drive comprises storing the at least one object in at least one of nonvolatile media or a volatile memory in the data storage drive in a form of intermediate object code.

3. The method of claim 2 and further comprising:
   reading the intermediate object code from the nonvolatile media or the volatile memory; and
   assembling the intermediate object code as executable code in the data storage drive or in the application-execution component associated with the data storage drive.

4. The method of claim 3 and further comprising running the executable code in the data storage drive or in the application-execution component associated with the data storage drive.

5. The method of claim 4 and further comprising storing any results produced from running the executable code into at least one of the nonvolatile media or the volatile memory in the data storage drive.

6. The method of claim 4 and further comprising sending any results produced from running the executable code in the data storage drive to a host computer or to one or more other data storage drives.

7. The method of claim 6, wherein the host computer, the data storage drive, and the other data storage drives communicate via a network.

8. The method of claim 4 and further comprising monitoring the running of the user application within the data storage drive.

9. The method of claim 4 and further comprising sending status information related to the running of the user application to a host computer that communicates with the data storage drive.

10. A system adapted to instantiate an application programming interface (API) that is an application-level protocol that comprises a plurality of different commands with each of the plurality of different commands having a pre-defined structure with bit patterns having defined logical meanings that specify a type of command and modifiers for the command, and each of the plurality of commands being communicable by a host simultaneously to a plurality of data storage drives without involvement of any intermediate hosts and servers, the API enables communication with a data storage drive for installation and execution of a user application within the data storage drive independent of a server, the system comprising:
    a processor;
    a memory communicatively coupled to the processor, the memory having stored therein computer-executable instructions implementing the API and which, when executed, cause the processor to:
    enable the installation of the user application as key-value objects on the data storage drive with a first API command of the plurality of different commands according to the bit patterns and without use of a server; and
    enable execution of the user application within a controlled environment of the data storage drive with one or more second API commands of the plurality of different commands and without the use of the server, the controlled environment allowing for execution of the one or more second API commands without involvement of a host and the server and according to the bit patterns that have defined logical meanings in the one or more second API commands, and the controlled environment being capable of limiting memory resources available to the user application when the user application is running in the data storage drive.

11. The system of claim 10 and wherein the controlled environment supports local processing of user data stored within the data storage drive.

12. The system of claim 10, wherein the memory further having stored therein computer-executable instructions which, when executed, cause the processor to, in response to receiving an application-installation command, identify the user application by the key-value objects and load the user application into the controlled environment.

13. The system of claim 12, wherein the memory further having stored therein computer-executable instructions which, when executed, cause the processor to, in response to receiving an application-execution command, identify the user application by the key-value objects and execute the user application within the controlled environment.

14. The system of claim 10, wherein the memory further having stored therein computer-executable instructions which, when executed, cause the processor to, in response to receiving an application-watch command, identify the user application by the key-value objects and install the user application into the controlled environment as a watcher applet.

15. The system of claim 10, wherein the data storage drive is one of a disk drive, a solid state drive or a hybrid drive.

16. A method comprising:
providing an application programming interface that is an application-level protocol that comprises: a plurality of different commands with each of the plurality of different commands having a pre-defined structure with bit patterns having defined logical meanings that specify a type of command and modifiers for the command, and each of the plurality of commands being communicable by a host simultaneously to a plurality of data storage drives without involvement of any intermediate hosts and servers; and a plurality of different functions capable of being executed in the plurality of data storage drives in response to receiving the plurality of different commands in the plurality of different data storage drives;
assembling, by a processor, intermediate object code of a user application as executable code of the user application in a data storage drive; and
storing the executable code of the user application on at least one data storage medium in the data storage drive;
receiving an application-execution command of the plurality of different commands of the application programming interface in the data storage drive independently of the intermediate hosts and servers;
in response to receiving the application-execution command, loading the executable code based on the bit patterns in the application-execution command; and
running the executable code in a controlled environment of the data storage device and without involvement of any host based on the bit patterns in the application-execution command, the controlled environment being capable of limiting memory resources available to the executable code when the executable code is running in the data storage drive.

17. The method of claim 16 and wherein the at least one data storage medium comprises at least one of a nonvolatile data storage medium or a volatile memory in the data storage drive.

18. The method of claim 16 and further comprising storing the intermediate object code as one or more key-value objects in the data storage drive prior to assembling the intermediate object code.

19. The method of claim 16 and wherein the controlled environment supports local processing of user data stored within the data storage drive.

20. The method of claim 19 and further comprising:
in response to receiving the application-execution command, loading the executable code from the at least one data storage medium into the controlled environment; and
running the executable code in the controlled environment.

* * * * *